United States Patent
Kita et al.

(10) Patent No.: US 9,138,936 B2
(45) Date of Patent: Sep. 22, 2015

(54) STAMPER, ARTICLE AND METHOD FOR MANUFACTURING THE SAME

(75) Inventors: Hiroaki Kita, Aichi (JP); Kota Shirai, Shizuoka (JP); Katsuhiro Kojima, Hiroshima (JP)

(73) Assignees: Nippon Light Metal Company, Ltd., Tokyo (JP); Mitsubishi Rayon Co., Ltd., Tokyo (JP)

( * ) Notice: Subject to any disclaimer, the term of this patent is extended or adjusted under 35 U.S.C. 154(b) by 350 days.

(21) Appl. No.: 13/825,351

(22) PCT Filed: Sep. 28, 2011

(86) PCT No.: PCT/JP2011/072148
§ 371 (c)(1),
(2), (4) Date: Mar. 21, 2013

(87) PCT Pub. No.: WO2012/043607
PCT Pub. Date: Apr. 5, 2012

(65) Prior Publication Data
US 2013/0200541 A1  Aug. 8, 2013

(30) Foreign Application Priority Data
Sep. 29, 2010 (JP) ................................. 2010-218723

(51) Int. Cl.
*B29C 33/38* (2006.01)
*B29C 59/02* (2006.01)
(Continued)

(52) U.S. Cl.
CPC ................. *B29C 59/02* (2013.01); *B21J 5/002* (2013.01); *B22D 25/02* (2013.01); *B29C 33/38* (2013.01); *B29C 33/424* (2013.01); *C22C 21/00* (2013.01); *C22F 1/00* (2013.01); *C22F 1/04* (2013.01); *C25D 1/10* (2013.01); *G02B 1/11* (2013.01); *G11B 5/855* (2013.01); *B29C 59/046* (2013.01); *B29K 2905/02* (2013.01);

*B29K 2905/06* (2013.01); *B29K 2907/02* (2013.01); *B29K 2907/04* (2013.01); *Y10T 29/49988* (2015.01)
(Continued)

(58) Field of Classification Search
None
See application file for complete search history.

(56) References Cited

U.S. PATENT DOCUMENTS 8,910,700 B2 * 12/2014 Kojima et al. ................. 164/159
9,057,143 B2 *  6/2015 Kita et al. ............................. 1/1
(Continued)

FOREIGN PATENT DOCUMENTS

JP     49-029244 A      3/1974
JP   2003-342658 A     12/2003
(Continued)

OTHER PUBLICATIONS

International Search Report dated Jan. 10, 2012 for International application No. PCT/JP2011/072148.
(Continued)

*Primary Examiner* — Ryan Ochylski
(74) *Attorney, Agent, or Firm* — Morgan, Lewis & Bockius LLP

(57) ABSTRACT

The invention relates to a stamper in which an oxide film having a fine concave-convex structure made up of a plurality of fine pores having an aspect ratio represented by [the depth of the fine pores/the average interval between the fine pores] of 1 to 4 is formed on the surface of an aluminum base material which is made of aluminum having a content of Ti of 150 ppm to 500 ppm, a content of B or C of 1 ppm to 50 ppm and a purity of 99.9% or more. According to the invention, it is possible to provide a low-cost stamper in which the emergence of a pattern derived from the traces of crystal grains on the surface of the oxide film is suppressed, an article having a favorable appearance, which is manufactured using the above stamper, and a method for manufacturing the above.

3 Claims, 5 Drawing Sheets

(51) Int. Cl.
B29C 33/42 (2006.01)
C22C 21/00 (2006.01)
C22F 1/00 (2006.01)
C22F 1/04 (2006.01)
G02B 1/11 (2015.01)
G11B 5/855 (2006.01)
B21J 5/00 (2006.01)
B22D 25/02 (2006.01)
C25D 1/10 (2006.01)
B29C 59/04 (2006.01)

(56) References Cited

U.S. PATENT DOCUMENTS

2009/0194914 A1* 8/2009 Uozu et al. .................. 264/496
2010/0243458 A1* 9/2010 Kojima et al. ................ 205/50
2010/0283165 A1 11/2010 Ihara
2012/0171427 A1* 7/2012 Kita et al. .................... 428/156
2013/0088784 A1* 4/2013 Kojima et al. ............... 359/601
2015/0053566 A1* 2/2015 Kojima et al. ............... 205/122

FOREIGN PATENT DOCUMENTS

| JP | 2005-156695 | 6/2005 |
| JP | 2010-005841 A | 1/2010 |
| JP | 4531131 B | 6/2010 |
| JP | 2010-222629 | 10/2010 |
| WO | 2008/001847 A1 | 1/2008 |
| WO | 2011/030850 A1 | 3/2011 |

OTHER PUBLICATIONS

Japanese Office Action issued in Japanese Patent Application No. 2011-545963 on Mar. 24, 2015.

* cited by examiner

FIG. 1A

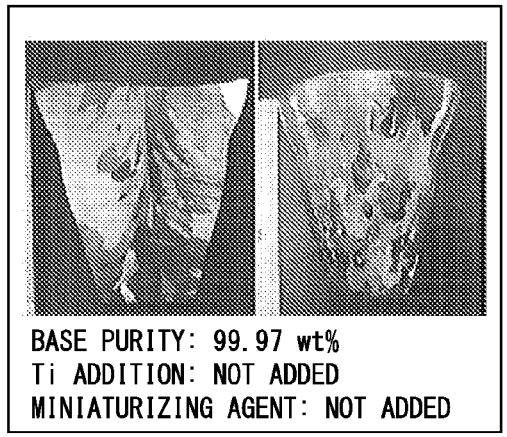

BASE PURITY: 99.97 wt%
Ti ADDITION: NOT ADDED
MINIATURIZING AGENT: NOT ADDED

FIG. 1B

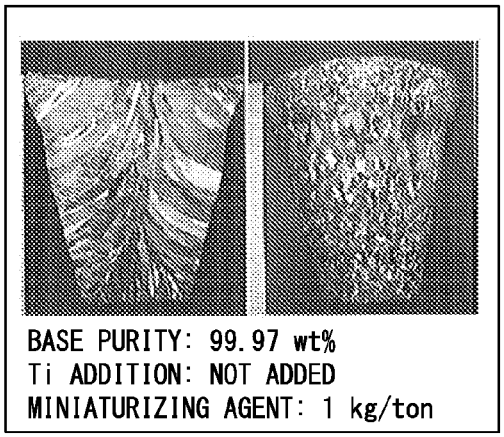

BASE PURITY: 99.97 wt%
Ti ADDITION: NOT ADDED
MINIATURIZING AGENT: 1 kg/ton

FIG. 1C

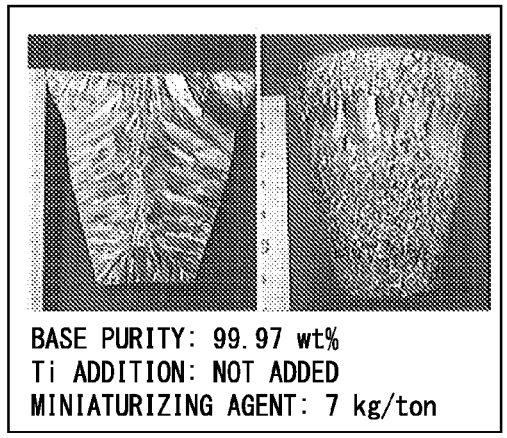

BASE PURITY: 99.97 wt%
Ti ADDITION: NOT ADDED
MINIATURIZING AGENT: 7 kg/ton

FIG. 1D

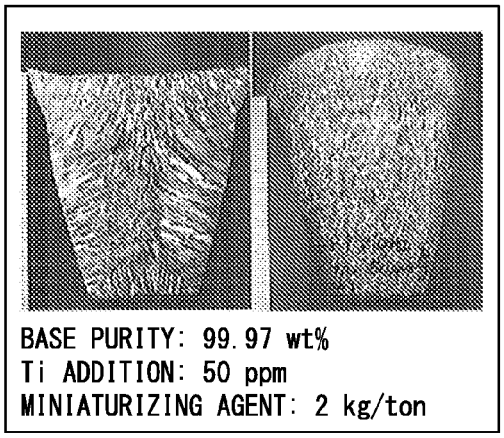

BASE PURITY: 99.97 wt%
Ti ADDITION: 50 ppm
MINIATURIZING AGENT: 2 kg/ton

FIG. 1E

BASE PURITY: 99.97 wt%
Ti ADDITION: 100 ppm
MINIATURIZING AGENT: 2 kg/ton

FIG. 1F

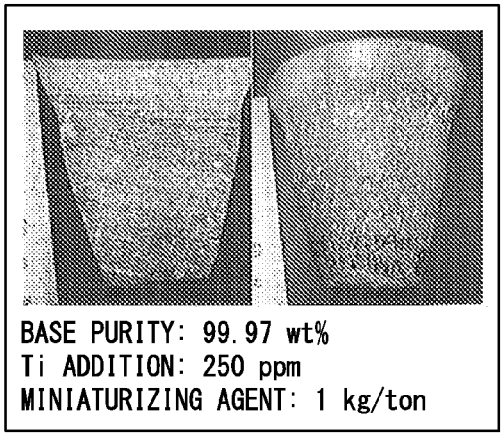

BASE PURITY: 99.97 wt%
Ti ADDITION: 250 ppm
MINIATURIZING AGENT: 1 kg/ton

CAST SIZE: 508 mmT × 1110 mmW × 3650 mmL
PHOTOGRAPH SIZE:
    1/4 SIZE OF 508 mmT × 1110 mmW
BASE PURITY: 99.97 wt%
Ti ADDITION: NOT ADDED
MINIATURIZING AGENT: NOT ADDED

CAST SIZE: 508 mmT × 1110 mmW × 3650 mmL
PHOTOGRAPH SIZE:
    1/4 SIZE OF 508 mmT × 1110 mmW
BASE PURITY: 99.97 wt%
Ti ADDITION: 300 ppm
MINIATURIZING AGENT: 0.15 kg/ton ADDED

EXAMPLE 1

EXAMPLE 2

COMPARATIVE EXAMPLE 1

COMPARATIVE EXAMPLE 2

COMPARATIVE EXAMPLE 3

COMPARATIVE EXAMPLE 4

STAMPER, ARTICLE AND METHOD FOR MANUFACTURING THE SAME

TECHNICAL FIELD

The present invention relates to a stamper having a fine concave-convex structure made up of a plurality of fine pores formed by anodizing the surface of an aluminum base material, an article manufactured using the stamper (an antireflection article and the like), and a method for manufacturing the same.

Priority is claimed on Japanese Patent Application No. 2010-218723, filed Sep. 29, 2010, the content of which is incorporated herein by reference.

BACKGROUND ART

In recent years, researches have been made to reduce reflected light from the liquid crystal surface of a television, a mobile phone or the like by providing an antireflection structure having a fine concave-convex structure, the cycle of which is controlled to be the wavelength of visible light or less, to the surface of the article. In addition, as one of such methods, a method for manufacturing an antireflection article by forming a fine concave-convex structure through the anodizing of the surface of aluminum, and transferring the fine concave-convex structure to a molding material, such as a resin have been adopted. Reported examples of the fine concave-convex structure formed through anodizing include a structure made up of a plurality of fine pores having a substantially circular cone shape, a substantially circular truncated cone shape or the like.

In a case in which the surface of aluminum is anodized so as to produce a stamper, and the surface is transferred so as to manufacture an article, since the shape of the surface of the stamper is mirrored at the surface of a transfer target as it is, the regularity or shape of the surface of the stamper is important in terms of the antireflection function.

Therefore, it is found that it is preferable to contain an extremely small number of secondary phase particles, which may form a defect in an oxide film, in aluminum, and a fine concave-convex structure having a little defect can be obtained by applying pure aluminum with a small number of elements to be added and impurities, which serve as the origin of the secondary phase particles (for example, refer to Paragraph [0025] in PTL 1).

CITATION LIST

Patent Literature

[PTL 1] Japanese Unexamined Patent Application, First Publication No. 2005-156695

SUMMARY OF INVENTION

Technical Problem

However, in a case in which high-purity aluminum having a purity of 99.9% or more is simply cast, crystal grains are liable to become coarse, and a coarse crystalline pattern is generated on the surface of aluminum. Therefore, when the surface of aluminum is anodized with the coarse crystalline pattern on the surface as it is, the crystalline pattern also emerges on the surface of an oxide film. In addition, consequently, the crystalline pattern is transferred even to the surface of an object to be transferred, such as a resin, and the physical appearance is impaired.

The coarse crystal grains can be made into fine recrystallized grains through recrystallization by plastic working and a thermal treatment; however, in the recrystallized grains, the traces of the original orientations of the coarse crystal grains remain at a size at which the heterogeneity of the crystal orientations (metal flow pattern) can be visually recognized.

Therefore, it is necessary to repeat the recrystallization, that is, repeat plastic working and a thermal treatment in order to remove the heterogeneity of the crystal orientations caused by the original coarse crystal grains, which increases the number of processes and, consequently, creates a tendency of an increase of the costs.

An object of the invention is to provide a stamper having an oxide film with a fine concave-convex structure made up of a plurality of fine pores formed on the surface of an aluminum base material, in which the emergence of a pattern derived from the traces of crystal grains on the surface of the oxide film is suppressed and the costs are low, an article which is manufactured using the stamper and has a favorable appearance, and a method for manufacturing the same.

Solution to Problem

A first aspect of the invention relates to a stamper in which an oxide film having a fine concave-convex structure made up of a plurality of fine pores having an aspect ratio represented by [the depth of the fine pore/the average interval between the fine pores] of 1 to 4 is formed on the surface of an aluminum prototype which is made of aluminum having a content of Ti of 100 ppm to 500 ppm, a content of B or C of 1 ppm to 50 ppm and a purity of 99.9% or more, and has an average crystal grain diameter of 1 mm or less.

In the stamper, the content of Fe is preferably 200 ppm or less.

The stamper preferably has a metallic structure having an average crystal grain diameter of 70 μm or less.

A second aspect of the invention is a method for manufacturing the stamper in which an oxide film having a fine concave-convex structure made up of a plurality of fine pores is formed on a surface of an aluminum prototype, including a melting process for adding Ti to aluminum having a purity of 99.9% or more and melting the mixture so as to produce molten metal, and a casting process for performing casting while adding a miniaturizing agent to the molten metal.

It is preferable that Ti added in the melting process be 100 ppm to 500 ppm, and, in the casting process, the miniaturizing agent be added to the molten metal so that a content of B or C in the stamper becomes 1 ppm to 50 ppm.

It is preferable that the content of Ti after the casting process be 100 ppm to 500 ppm, and the content of B or C be 1 ppm to 50 ppm.

The miniaturizing agent is preferably an Al—Ti—C alloy.
The miniaturizing agent is preferably an Al—Ti—B alloy.
It is preferable that, after the casting process, a forging process be further performed.

It is preferable that the average crystal grain diameter of the aluminum prototype after the casting process be 1 mm or less, and the average crystal grain diameter of the aluminum prototype be set to 70 μm or less through the forging process.

The method for manufacturing the stamper preferably further includes the following process (a), (a) a process for anodizing the aluminum prototype in an electrolytic solution so as to form an oxide film on a surface of the aluminum prototype.

A third aspect of the invention relates to a method for manufacturing the stamper in which an oxide film having a fine concave-convex structure made up of a plurality of fine pores is formed on a surface of an aluminum prototype including the following process (a), in which aluminum having a content of Ti of 100 ppm to 500 ppm, a content of B or C of 1 ppm to 50 ppm, and a purity of 99.9% or more is used as the following aluminum prototype, (a) a process for anodizing the aluminum prototype in an electrolytic solution so as to form an oxide film on a surface of the aluminum prototype.

In the process (a), the thickness of an oxide film formed on a surface of the aluminum prototype is preferably 0.01 μm to 30 μm.

The method for manufacturing the stamper preferably further includes the following processes (b) and (c), (b) a process for removing the oxide film after the process (a); and (c) a process for anodizing the aluminum prototype again in an electrolytic solution after the process (b) so as to form an oxide film having a plurality of fine pores.

The method for manufacturing the stamper preferably further includes the following processes (d) to (f), (d) a process for enlarging the diameter of the fine pores after the process (c) or the following process (e);

(e) a process for anodizing the aluminum prototype again in an electrolytic solution after the process (d); and (f) a process for repeating the processes (d) and (e).

A fourth aspect of the invention relates to a method for manufacturing an article, in which the article having a fine concave-convex structure formed on a surface is obtained using the stamper according to the first aspect of the invention or the stamper obtained by the manufacturing method according to the second or third aspect of the invention.

Meanwhile, in the aluminum base material of the invention, other elements are actively included in the aluminum; however, since the aluminum is produced using an aluminum solid metal blank having a purity of substantially 3 N or more, in the present specification, the aluminum is expressed using "metal" instead of "alloy".

Advantageous Effects of Invention

In the stamper of the invention, the emergence of a pattern derived from the traces of crystal grains on the surface of an oxide film is suppressed, and the costs are low.

According to the method for manufacturing the stamper of the invention, it is possible to manufacture a stamper in which the emergence of a pattern derived from the traces of crystal grains on the surface of an oxide film is suppressed, and the costs are low.

Since the article of the invention is obtained using the stamper in which the emergence of a pattern derived from the traces of crystal grains on the surface of an oxide film is suppressed, the appearance is favorable.

According to the method for manufacturing an article of the invention, since the stamper in which the emergence of a pattern derived from the traces of crystal grains on the surface of an oxide film is suppressed is used, it is possible to manufacture an article having a favorable appearance.

BRIEF DESCRIPTION OF DRAWINGS

FIG. 1A-1F illustrate photographs of metallic structures illustrating the relationship between the addition amount of Ti, the addition amount of a miniaturizing agent, and the crystal grains in an ingot.

DESCRIPTION OF EMBODIMENTS

<Aluminum Prototype>

Figure 2A:
FIG. 2A-2B illustrate photographs of metallic structures illustrating the difference in the crystal grain in the ingot depending on the presence and absence of Ti and the miniaturizing agent.

In a case in which pure aluminum having a purity of 99.9% or more is cast using an ordinary DC casting method or the like, columnar crystals are obtained, and the size of the crystal grains is at an order of centimeters. It is possible to obtain fine crystal grains by performing plastic working and a thermal treatment on an ingot having the above coarse crystal grains, and conducting recrystallization. However, in the recrystallized structure, the trace of the coarse crystal grains of the ingot remain, and a heterogeneity, which is caused by the heterogeneity of the orientations and has a visible size (metal flow pattern), remains even when the crystal grain diameter is miniaturized to an invisible level.

This orientation heterogeneity serves as a cause of concaves and convexities resulting from the difference in the orientation-dependent growth rates in an oxide film during the subsequent anodizing, and the concaves and convexities are transferred even to a transfer target to which the surface of the oxide film is transferred so as to impair the physical appearance. In order to reduce the orientation heterogeneity, it is effective to repeat recrystallization through plastic working and a thermal treatment, but there is a problem in that the manufacturing costs increase due to an increase in the number of man-hours.

Therefore, the present inventors repeated thorough studies regarding means for extremely miniaturizing a cast structure so that regular concaves and convexities can be formed in the oxide film even in aluminum having a high purity.

In the process, it was found that, when an appropriate amount of Ti is added to pure aluminum in advance and then a small amount of a miniaturizing agent, such as Al-5% Ti-1% B, is added, a miniaturized cast structure can be obtained, and, even when the number of times of the plastic working and the like is decreased afterward, fine crystal grains can be obtained, and the homogeneity of the crystal orientations and the reduction of the manufacturing costs can be achieved. In addition, at the same time, it was found that the reduction of secondary phase particles, which may form defects in the oxide film, can be achieved by suppressing elements to be added or impurities to the minimum extent.

The details will be described hereinafter.

(Miniaturization of the Cast Structure)

First, the component composition for miniaturizing the structure of an aluminum metal, which constructs an aluminum base material in the invention, will be described.

When the crystal grains in an ingot are coarse, since the trace remains coarsely even after plastic working and a thermal treatment, the trace was made unnoticeable by miniaturizing the crystal grains in the ingot.

In order to miniaturize the crystal grains in an aluminum ingot, generally, a miniaturizing agent is added to molten aluminum. Examples of the miniaturizing agent include an aluminum-titanium alloy, an aluminum-titanium-boron alloy and an aluminum-titanium-carbon alloy, and, from the viewpoint of the suppression of the generation of secondary phase particles induced from added metal elements, among titanium-containing miniaturizing agents, an aluminum-titanium-boron alloy (Al—Ti—B) or an aluminum-titanium-carbon alloy (Al—Ti—C) is preferably used. Generally, when a miniaturizing agent, such as Al-5% Ti-1% B, Al-3% Ti-1% B or Al-5% Ti-0.2% B, is added to molten aluminum, the number of crystal nuclei generated using $TiB_2$ particles as nuclei increases, and the growth of the respective crystals is suppressed. However, in the case of high-purity aluminum having a purity of 99.9% or more, it is difficult to miniaturize the crystal grains simply by adding a miniaturizing agent, and, particularly, in the case of high-purity aluminum having a purity of 99.95% or more, the crystal grains are not miniaturized at an ordinary addition amount (0.1 kg/ton to 1.0 kg/ton) of Al-5% Ti-1% B, and the crystal grains were not miniaturized even when 7.0 kg/ton of Al-5% Ti-1%13, which corresponds to 350 ppm of an equivalent amount of Ti, was added.

In addition, generally, the addition of an Al—Ti—B-based miniaturizing agent leads to an increase in $TiB_2$, which is secondary phase particles, so as to increase defects in the oxide film, and cause scratches in the subsequent cutting process. Therefore, it is necessary to set the addition amount of B to the minimum extent by suppressing the addition amount of a miniaturizing agent, Al-5% Ti-1% B, in the range of 0.10 kg/ton to 2.0 kg/ton.

Meanwhile, the addition amount of the miniaturizing agent can be suppressed by adding an alloy element, such as Mg or Si; however, in this case, secondary phase particles induced from the alloy element are generated such that defects in the oxide film increases.

Therefore, attention was paid to Ti which has an action of assisting the miniaturization of a cast structure, but does not easily generate secondary phase particles, and the generation of secondary phase particles could be suppressed while miniaturizing the crystal grains of the ingot by adding only Ti before adding the miniaturizing agent, and then adding a small amount of the miniaturizing agent (Al—Ti—B-based miniaturizing agent or the like) so as to prevent an increase in metal elements which generate secondary phase particles, such as $TiB_2$.

In addition, in a case in which the addition amount of Ti was decreased before adding the miniaturizing agent, the crystal grains were not miniaturized at a small addition amount of the miniaturizing agent. The generation amount of secondary phase particles was suppressed by tightly suppressing the addition amount of Ti so that a cast structure was barely miniaturized. The total addition amount of Ti is preferably 100 ppm to 500 ppm, more preferably 110 ppm to 450 ppm, and more preferably 150 ppm to 350 ppm. When the addition amount does not reach 100 ppm, the miniaturization effect is not sufficient, and, when the addition amount is increased so as to exceed 500 ppm, secondary phase particles, such as $TiAl_3$, are generated.

The relationship between the addition amount of Ti, the addition amount of an Al—Ti—B-based miniaturizing agent, and the miniaturization of crystal grains in a small ingot is illustrated in FIG. 1. In a case in which the addition amount of Ti before adding the miniaturizing agent is 50 ppm or less, the crystal grains are not sufficiently miniaturized (refer to FIGS. 1A to 1D), and the crystal grains are almost miniaturized at an addition amount of Ti of 100 ppm before adding the miniaturizing agent (refer to FIGS. 1E and 1F). On the other hand, in a case in which Ti is not added in advance, and only the miniaturizing agent Al-5% Ti-1% B is simply added at 7 kg/ton, which corresponds to 350 ppm of an equivalent amount of Ti, the crystal grains are not miniaturized (refer to FIG. 1C). Crystal grains are miniaturized by adding 100 ppm or more of Ti before adding the miniaturizing agent, and then adding the miniaturizing agent. In addition, the addition amount of the miniaturizing agent can be reduced by adding Ti in advance, and secondary phase particles, such as $TiB_2$, can be reduced. The crystal grain diameters of the ingot were approximately 4700 μm in FIG. 1A, approximately 3500 μm in FIG. 1B, approximately 2000 μm in FIG. 1C, approximately 1100 μm in FIG. 1D, approximately 500 μm in FIG. 1F, and approximately 200 μm in FIG. 1F. When the crystal grains in the ingot reach 1 mm or less, the crystal grains can be miniaturized to 70 μm or less at which the crystal grains are not visually noticeable, through the subsequent plastic working, which is preferable.

Figure 2B:
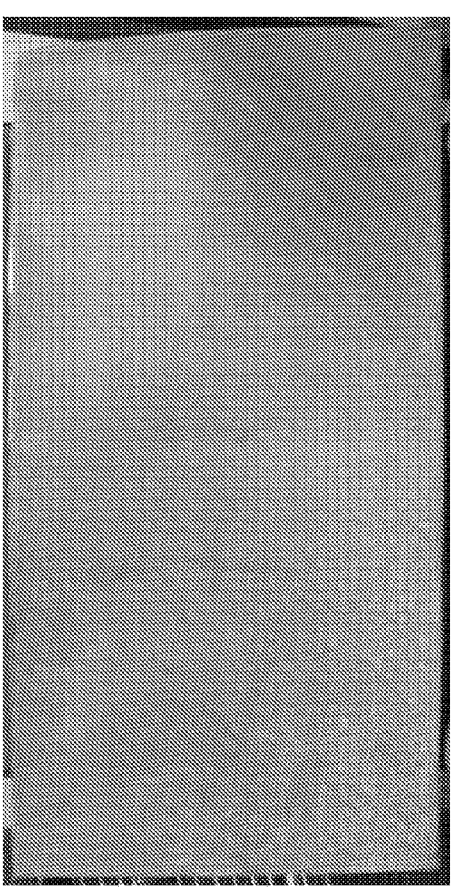

In addition, the miniaturization of crystal grains in a large ingot, which was performed after confirming the above results, is illustrated in FIG. 2. FIG. 2A illustrates a case in which Ti and the miniaturizing agent are not added, and FIG. 2B illustrates a case in which 300 ppm of Ti is added before adding the miniaturizing agent, and then 0.15 kg/ton of a miniaturizing agent Al-5% Ti-1% B is added. As illustrated in FIG. 2B, the crystal grains becomes as fine as 200 μm to 300 μm by adding Ti and the Al—Ti—B-based miniaturizing agent sequentially.

In addition, the addition amount of B is preferably 1 ppm to 50 ppm, and more preferably 3 ppm to 10 ppm since the amount of $TiB_2$, which are secondary phase particles, can be suppressed. When the addition amount does not reach 1 ppm, the miniaturization effect of the miniaturizing agent does not work, and, when the addition amount is increased so as to exceed 50 ppm, secondary phase particles, such as $TiB_2$, are generated. Therefore, it is important to reduce the addition amount of the miniaturizing agent and suppress the addition amount of B by adding Ti before adding the miniaturizing agent.

It is possible to obtain the same miniaturization effect as in a case in which the Al—Ti—B-based miniaturizing agent is added when using an Al—Ti—C-based miniaturizing agent as the miniaturizing agent. In a case in which the Al—Ti—C-based miniaturizing agent is used, the addition amount of C is preferably 1 ppm to 50 ppm, more preferably 1 ppm to 30 ppm, and still more preferably 1 ppm to 6 ppm. When the addition amount of C does not reach 1 ppm, a sufficient miniaturization effect cannot be obtained. When the addition amount is increased so as to exceed 50 ppm, an increase in TiC, which is secondary phase particles, results, which is not preferable. In order for the reduction of the secondary phase particles, the addition amount of C is preferably set not to exceed 30 ppm, and more preferably set not to exceed 6 ppm. In addition, in a case in which Al—Ti—B or Al—Ti—C is used as the miniaturizing agent, when the addition amount is large as described above, $TiB_2$ or TiC, which are secondary phase particles, increases. However, in a case in which Al—Ti—C is used, the miniaturization effect can be obtained with a smaller addition amount than when Al—Ti—B is added.

In addition, it is necessary to maintain the content of other impurities at 500 ppm or less. When the content of the impurities is increased so as to exceed 500 ppm, the impurities serve as a cause of the generation of secondary phase particles. When aluminum having the above composition is used, it is possible to obtain an aluminum base material in which a small amount of secondary phase particles are present, crystals are miniaturized only by casting, and are not coarsened during annealing after cold forging.

Fe is an element that is highly likely to be included in a large amount as an inevitable impurity even in aluminum, and does not easily form a solid solution in aluminum, even in a case in which Fe is the only impurity, Al—Fe-based secondary phase particles are liable to be generated. Therefore, the content of Fe is preferably 200 ppm or less.

As described above, when the contents of Ti and B or C, which are added to or included in molten aluminum, and, furthermore, the content of inevitable impurities are finely regulated, an ingot having miniaturized crystal grains can be obtained using an ordinary DC casting method or the like.

(Method of the Plastic Working)

Next, a treatment method for structure miniaturization will be described.

The miniaturization of a cast structure becomes possible through the above adjustment of the component composition, and a heterogeneity caused by the orientations of the crystals can be reduced by the miniaturization of the crystal grains. However, in a case in which the crystal grain size is still large, and the crystal grains do not reach 70 μm or less at which the crystal grains become visually unnoticeable, it is preferable to further miniaturize the crystal grains.

In a plastic working method, such as rolling or extrusion, since the working direction is limited, a worked structure in which the crystal grains in an ingot are stretched in the working direction, is formed, and the traces of the worked structure remain in the working direction even after recrystallization through a thermal treatment such that a sinewy structure is formed. Such a structure is heterogeneous, and the physical appearance is impaired. On the other hand, in free forging, since the working direction is freely selected, it is advantageous that an isotropic and homogeneous structure is produced.

In addition, since the working direction is limited in rolling or extrusion, the degree of working is determined by the dimension of a material before working and the dimension of an end product. Meanwhile, since it is possible to further repeat the plastic working by changing the working direction during free forging, a larger degree of working can be obtained. A larger degree of working results in the accumulation of distortion, which serves as the driving force of recrystallization, and the accumulation of distortion makes the recrystallization structure finer. When such an aluminum base material is anodized, and a fine concave-convex structure is formed, a homogeneous fine concave-convex structure is obtained, which contributes to the homogeneity of a transfer target to which the surface of the oxide film is transferred.

The forging method is largely classified into hot forging which is mainly intended to break a relatively coarse forged structure so as to form a homogenous structure, and cold forging which is mainly intended for the miniaturization of a material homogenized through hot forging, and a subsequent thermal treatment. In a case in which a high homogeneity is required, first, homogenization is achieved through hot forging, and miniaturization is achieved through the subsequent cold forging and thermal treatment. However, in a case in which a high homogeneity is not required, hot forging may not be performed.

The preheating temperature prior to hot forging is important. When the preheating temperature is too low, since recrystallization does not occur during forging, homogenization cannot be expected. When the preheating temperature is too high, grains significantly grow during residual heat such that coarse crystal grains are generated, and the traces thereof remain even after cold forging. The preheating temperature is preferably 370° C. to 470° C., and preferably approaches to 420° C. Hot forging is performed at, basically, a (1.5S–⅔U)×3 cycle, and, in a case in which a higher homogeneity is required, hot forging is similarly repeated after additional preheating.

Here, regarding the expression of 1.5S or ⅔U, 1.5S represents the solid forging with a forging ratio of 1.5, and ⅔U represents the upset forging with a forging ratio of ⅔ as defined in JIS. The order of the solid forging and the upset forging does not matter, and may be reversed.

When the number of cycles of hot forging is large, a homogenous structure is easily obtained, but the temperature of a material to be forged significantly decreases due to an increase in the forging time. When the temperature of a material to be forged becomes lower than 330° C. due to the above temperature decrease, it becomes difficult to cause recrystallization, and the homogenization of the structure, which is the first object of hot forging, cannot be achieved. In order to sufficiently homogenize the structure through hot forging repeated several times, it becomes necessary to increase the preheating temperature during the above period; however, when the preheating temperature is increased, the crystal grains become liable to be coarsened during the preheating. Therefore, the number of cycles of forging is favorably large, but forging is preferably stopped after approximately three cycles. When the number of cycles of forging is decreased so as to suppress the temperature decrease during forging, it is also possible to decrease the preheating temperature. However, in this case, in order to obtain a homogeneous structure, it becomes necessary to offset the decrease in the number of cycles with an increase in the number of hot forging and reheating, which is industrially unrealistic. In addition, recrystallization through the repetition of cold forging and annealing can be considered instead of recrystallization through hot forging, but man-hours are increased, which is industrially unrealistic.

In addition, when the forging ratio in a single forging process is set to be large, such as a (2S–½)×3 cycle, much distortion is accumulated even after the same number of cycles, which is advantageous in terms of the miniaturization of crystal grains. However, wrinkles on the surface are liable to be entangled into the inside during forging, and the wrinkles appear as defect during the subsequent anodizing, which is not preferable.

Since the principle object of cold forging is the accumulation of distortion for the miniaturization of recrystallized grains, a higher forging ratio is preferable for miniaturization. However, in a case in which the forging ratio is too high, since cracking is caused during forging, the (1.5S–⅔U)×3 cycle is preferable. In addition, during cold forging, the temperature of a material to be forged is increased due to working heat. In a case in which the temperature exceeds 150° C. at which distortion is significantly released, the material to be forged is preferably cooled through water cooling, air cooling or the like.

Annealing after forging is performed to cause recrystallization using distortion accumulated through cold forging as a driving force. The annealing temperature is important, and, when the annealing temperature is too low, recrystallization does not occur, and a worked structure remains. On the other hand, when the annealing temperature is too high, grain growth is caused such that coarse crystal grains are generated. The annealing temperature is preferably 330° C. to 380° C., and preferably approaches to 340° C. When the annealing time is too short, a worked structure remains, and, when the annealing time is too long, secondary phase particles resulting from impurity elements are coarsened. The annealing time is preferably 30 minutes to 120 minutes.

A forged and annealed material manufactured in the above manner is cut into a desired shape so as to produce an aluminum base material. The aluminum base material may have a sheet shape or a roll shape, and the material according to the invention can easily obtain a desired shape through cutting working. Particularly, when a stamper obtained by anodizing the surface of the aluminum base material cut into a roll shape is used, a fine concave-convex structure can be continuously transferred, and it is possible to increase the productivity. In a case in which a roll-shaped material having aluminum deposited on the surface is manufactured through a sputtering method, since a special apparatus which can sputter aluminum in a roll shape is required, the costs are increased, but it is possible to easily obtain a roll shape from the material according to the invention.

<Method for Manufacturing the Stamper>

Hereinafter, a method for manufacturing the stamper in which an oxide film having a fine concave-convex structure made up of a plurality of fine pores, the average interval of which is the wavelength of visible light or less, is formed on the surface by anodizing the surface of the aluminum base material will be described referring to FIG. 4.

The method for manufacturing the stamper of the invention is a method including the following process (a), preferably further includes the following processes (b) and (c), and more preferably further includes the following processes (d) to (f).

(a) A process for forming an oxide film on the surface of the aluminum base material by anodizing the aluminum base material in an electrolytic solution (first oxide film-forming process).

(b) A process for removing the oxide film after the above process (a) (oxide film-removing process).

(c) A process for forming an oxide film having a plurality of fine pores by anodizing the aluminum base material again in an electrolytic solution after the above process (b) (second oxide film-forming process).

(d) A process for enlarging the diameter of the fine pores after the above process (c) or the following process (e) (pore diameter-enlarging treatment process).

(e) A process for anodizing the aluminum base material again in an electrolytic solution after the above process (d) (oxide film-reforming process).

(f) A process for repeating the above processes (d) and (e) (repeating process).

According to the method including the processes (a) to (f), it is possible to obtain a stamper in which fine pores having a taper shape whose diameter gradually decreases in the depth direction from the opening portion are periodically formed on the surface of a mirrored aluminum base material, and, consequently, an oxide film having a plurality of fine pores is formed on the surface.

Prior to the process (a), a pretreatment for removing the oxide film on the surface of the aluminum base material may be performed. Examples of a method for removing the oxide film include a method in which the aluminum base material is immersed in a liquid mixture of chromium acid and phosphoric acid, and the like.

In addition, while the regularity of the array of the fine pores slightly decreases, depending on the use of a material to which the surface of the stamper has been transferred, the manufacturing method may be performed from the process (c) without performing the process (a).

Hereinafter, the respective processes will be described in detail.

(Process (a))

Figure 4:
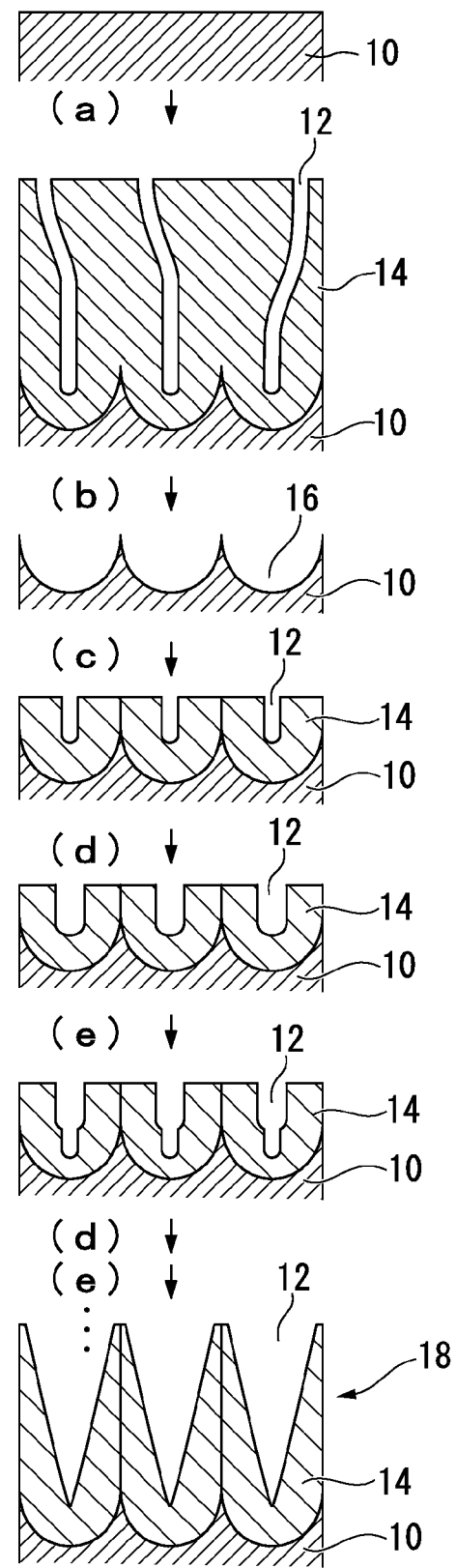
FIG. 4 is an explanatory view explaining an example of the method for manufacturing the stamper of the invention.

In the process (a), the surface of a mirrored aluminum base material is anodized in an electrolytic solution at a constant voltage, and an oxide film 14 having fine pores 12 is formed on the surface of the aluminum base material 10 as illustrated in FIG. 4.

Examples of the electrolytic solution include an acidic electrolytic solution and an alkaline electrolytic solution, and an acidic electrolytic solution is preferable.

Examples of the acidic electrolytic solution include oxalic acid, sulfuric acid, phosphoric acid, mixtures thereof, and the like.

In a case in which oxalic acid is used as the electrolytic solution, the concentration of oxalic acid is preferably 0.7 M or less. When the concentration of oxalic acid exceeds 0.7 M, there are cases in which the current value becomes too high during anodizing such that the surface of the oxide film becomes coarse.

In addition, the voltage during anodizing is appropriately set to 30 V to 80 V. When the voltage during anodizing is set to 30 V to 60 V, it is possible to obtain a stamper in which an oxide film having highly regular pores at an average interval of approximately 100 nm is formed on the surface. There is a tendency for the regularity to degrade when the voltage during anodizing is above or below the above range, and there are cases in which the average interval becomes larger than the wavelength of visible light.

The temperature of the electrolytic solution is preferably 60° C. or less, and more preferably 45° C. or less. When the temperature of the electrolytic solution exceeds 60° C., there is a tendency for a phenomenon of so-called "burning" to occur, and there are cases in which the fine pores are broken or the surface is melted such that the regularity of the fine pores is disrupted.

In a case in which sulfuric acid is used as the electrolytic solution, the concentration of sulfuric acid is preferably 0.7 M or less. When the concentration of sulfuric acid exceeds 0.7 M, there are cases in which the current value becomes too high during anodizing such that it becomes impossible to maintain the constant voltage.

In addition, when the voltage during anodizing is set to 25 V to 30 V, it is possible to obtain a stamper in which an oxide film having highly regular pores at an average interval of approximately 63 nm is formed on the surface. There is a tendency for the regularity to degrade when the voltage during anodizing is above or below the above range, and there are cases in which the average interval becomes larger than the wavelength of visible light.

The temperature of the electrolytic solution is preferably 30° C. or less, and more preferably 20° C. or less. When the temperature of the electrolytic solution exceeds 30° C., there is a tendency for a phenomenon of so-called "burning" to occur, and there are cases in which the fine pores are broken or the surface is melted such that the regularity of the fine pores is disrupted.

In the process (a), the oxide film 14, which is formed by performing anodizing for a long period of time, becomes thick so that it is possible to improve the regularity of the array of the fine pores 12. At this time, when the thickness of the oxide film 14 is set in the range from 0.01 μm to 30 μm, macro concaves and convexities caused by crystal grain boundaries are further suppressed, and it is possible to obtain a stamper more suitable for manufacturing of an article in optical use. The thickness of the oxide film 14 is more preferably 0.05 μm to 10 μm, and still more preferably 1 μm to 3 μm. The thickness of the oxide film 14 can be observed using a field-emission scanning electron microscope.

(Process (b))

After the process (a), the oxide film 14 formed through the process (a) is removed so that periodic dents, which correspond to the bottom portion of the removed oxide film 14 (called a barrier layer), that is, fine pore generation points 16 are formed as illustrated in FIG. 4.

When the formed oxide film 14 is temporarily removed, and the fine pore generation points 16 of anodizing are formed, it is possible to improve the regularity of ultimately-formed fine pores (for example, refer to "Applied Physics" by Masuda, 2000, Vol. 69, Issue No. 5, P. 558).

Examples of a method for removing the oxide film 14 include a method in which the oxide film is removed using a solution that selectively melts alumina without melting aluminum. Examples of the solution include a liquid mixture of chromium acid and phosphoric acid, and the like.

In the process (b), only some of the oxide film 14 may be removed, but more highly regular fine pores can be formed by fully removing the oxide film 14.

(Process (c))

The aluminum base material 10, in which the fine pore generation points 16 are formed, is anodized again in the electrolytic solution at a constant voltage so as to form the oxide film 14 again.

In the process (c), anodizing may be performed under the same conditions (electrolytic solution concentration, electrolytic solution temperature, formation voltage, and the like) as in the process (a).

Thereby, the oxide film 14, in which columnar fine pores 12 are formed as illustrated in FIG. 4, can be formed. Even in the process (c), deeper fine pores can be obtained as the time of the anodizing increases. However, for example, in a case in which a stamper is manufactured in order to manufacture an article in optical use, such as an antireflection article, herein, the thickness of the oxide film to be formed may be 0.01 µm to 0.5 µm, and it is not necessary to form an oxide film having a thickness as thick as formed in the process (a).

(Process (d))

After the process (c), a pore diameter-enlarging treatment, which enlarges the diameter of the fine pores 12 formed in the process (c), is performed so as to enlarge the diameter of the fine pores 12 as illustrated in FIG. 4.

Examples of a specific method of the pore diameter-enlarging treatment include a method in which the oxide film is immersed in a liquid to melt alumina, and the diameter of the fine pores formed in the process (c) is enlarged through etching. Examples of the solution include an aqueous solution of approximately 5 mass % of phosphoric acid, and the like. The diameter of the fine pores increases as the time of the process (d) increases.

(Process (e))

As illustrated in FIG. 4, when the base material is anodized again, columnar fine pores 12, which extend downward from the bottom portion of the columnar fine pores 12 and have a small diameter, are further formed.

The anodizing may be performed under the same conditions as in the process (a), or the conditions may be changed in various manners. Deeper fine pores can be obtained as the time of the anodizing increases.

(Process (f))

It is possible to make the shape of the fine pores 12 into a taper shape whose diameter gradually decreases in the depth direction from the opening portion as illustrated in FIG. 4 by repeating the processes (d) and (e), and, consequently, a stamper 18 in which the oxide film 14 having a plurality of the periodic fine pores 12 is formed on the surface can be obtained.

Fine pores having a variety of shapes can be formed by appropriately setting the conditions of the processes (d) and (e), for example, the anodizing time and the pore diameter-enlarging treatment time. Therefore, the conditions may be appropriately set depending on the use and the like of an article to be manufactured using the stamper. For example, when the processes (d) and (e) are repeated many times at short intervals, substantially conical fine pores can be obtained. In addition, inverted bell-shaped or sharp point-shaped fine pores can be formed by adjusting the time of the processes (d) and (e), whereby it is possible to manufacture a stamper having an appropriately changed shape. In addition, in a case in which the stamper is used to manufacture an antireflection article, such as an antireflection film, since it is possible to arbitrarily change the average interval or depth of fine pores by appropriately setting the conditions, it also becomes possible to design the optimal change in the refractive index.

(Stamper)

The stamper manufactured in the above manner has a number of periodic fine pores formed therein, and, consequently, has a fine concave-convex structure on the surface. In addition, when the average interval between the fine pores in the fine concave-convex structure is the wavelength of visible light or less, that is, 400 nm or less, a so-called moth-eye structure is formed.

When the average interval between the fine pores is larger than 400 nm, since visible light is scattered, the antireflection function does not sufficiently develop, and the stamper is not suitable for manufacturing of an antireflection article, such as an antireflection film.

The average interval between the fine pores is obtained by measuring 50 intervals between adjacent fine pores (i.e., the distance from the center of a fine pore to the center of an adjacent fine pore) through electron microscope observation, and averaging the values.

In a case in which the stamper is used to manufacture an antireflection article, such as an antireflection film, it is preferable that the average interval between the fine pores be the wavelength of visible light or less, and the depth of the fine pore be 50 nm or more, and the depth of the fine pore is more preferably 100 nm or more.

When the depth of the fine pore is 50 nm or more, the reflectivity on the surface of an article in optical use, which is formed by transferring the surface of the stamper, that is, the transferred surface decreases.

The depth of the fine pore is obtained by measuring the distance from the opening portion of the fine pore to the deepest portion when observed using an electron microscope.

The aspect ratio (depth/average interval) of the fine pores of the stamper is preferably 1.0 to 4.0, preferably 1.3 to 3.5, still more preferably 1.8 to 3.5, and most preferably 2.0 to 3.0. When the aspect ratio is 1.0 or more, it is possible to form a transferred surface having a low reflectivity, and the incident angle dependency or wavelength dependency also sufficiently decreases. When the aspect ratio is larger than 4.0, there is a tendency for the mechanical strength of the transferred surface to degrade.

The surface of the stamper, on which the fine concave-convex structure is formed, may be subjected to a mold-releasing treatment in order to facilitate the mold releasing. Examples of the mold-releasing treatment include a method for coating a silicone-based polymer or a fluorine polymer, a method for depositing a fluorine compound, a method for coating a fluorine-based or fluorine silicone-based silane coupling agent, and the like.

(Action Effects)

According to the invention, an ingot having a miniaturized structure can be obtained by finely adjusting the addition amount of Ti and B or C, which has a miniaturization function, and which is to be added to high-purity aluminum. Therefore, since fine and homogeneously-oriented crystal grains can be obtained even when the number of times of the subsequent plastic working is decreased, the emergence of secondary phase particles is also suppressed due to an extreme decrease in the content of other inevitable impurities, and therefore, when the ingot is anodized, an oxide film having a surface with an isotropic homogeneous pattern is easily formed, and, consequently, it becomes possible to provide a stamper having a high purity at low costs.

<Method for Manufacturing an Article>

The method for manufacturing an article having a fine concave-convex structure on the surface using the stamper of the invention is a method for transferring the fine concave-convex structure on the surface of the stamper of the invention to the surface of a transparent base material. Specific examples thereof include a method in which an active energy ray-curable resin composition is loaded between the stamper of the invention and the transparent base material, and the resin composition is cured by irradiating active energy rays on the resin composition so as to form a cured resin layer, to which the fine concave-convex structure of the stamper is transferred, on the surface of the transparent base material, and the transparent base material having the cured resin layer formed on the surface thereof is separated from the stamper (so-called optical imprint method).

(Transparent Base Material)

Examples of the shape of the base material include a film, a sheet, an injection-molded article, a press-molded article, and the like.

Examples of the material of the base material include polycarbonate, a polystyrene-based resin, polyester, an acryl-based resin, a cellulose-based resin (triacetyl cellulose), polyolefin, glass, and the like.

(Manufacturing Apparatus)

An article having a fine concave-convex structure on the surface is manufactured in the following manner using, for example, a manufacturing apparatus illustrated in FIG. 5.

An active energy ray-curable resin composition is supplied between a roll-shaped stamper 20 having a fine concave-convex structure (not shown) on the surface and a band-shaped film 42 (transparent base material) moving along the surface of the roll-shaped stamper 20, from a tank 22.

A film 42 and the active energy ray-curable resin composition are nipped between the roll-shaped stamper 20 and a nip roll 26 whose nip pressure is adjusted using a pneumatic cylinder 24, the active energy ray-curable resin composition is uniformly provided between the film 42 and the roll-shaped stamper 20, and, simultaneously, is loaded into fine pores in the fine concave-convex structure of the roll-shaped stamper 20.

An active energy ray is irradiated to the active energy ray-curable resin composition through the film 42 from an active energy ray irradiation apparatus 28 installed below the roll-shaped stamper 20 so as to cure the active energy ray-curable resin composition, thereby forming a cured resin layer 44 to which the fine concave-convex structure on the surface of the roll-shaped stamper 20 is transferred.

The film 42 having the cured resin layer 44 formed on the surface thereof is separated from the roll-shaped stamper 20 using a separating roll 30 so as to obtain an article 40 having the fine concave-convex structure on the surface thereof The active energy ray irradiation apparatus 28 is preferably a high-pressure mercury lamp, a metal halide lamp, or the like, and, in this case, the optical irradiation energy amount is preferably 100 mJ/cm$^2$ to 10000 mJ/cm$^2$.

(Article)

Figure 6:
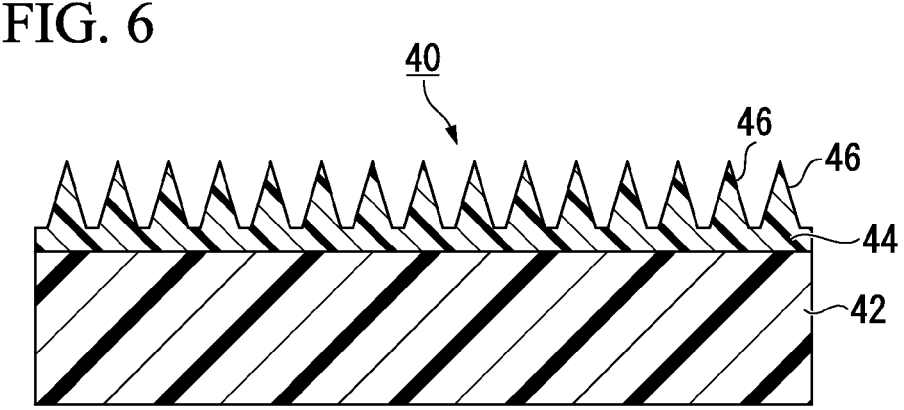
FIG. 6 is a cross-sectional view illustrating an example of the article having a fine concave-convex structure on the surface.

FIG. 6 is a cross-sectional view illustrating an example of the article 40 having the fine concave-convex structure on the surface thereof, which is obtained using the manufacturing method of the invention.

The cured resin layer 44 is a film made of a cured substance of an active energy ray-curable resin composition described below, and has a fine convex-concave structure on the surface thereof.

The fine concave-convex structure on the surface of the article 40 in a case in which the stamper of the invention is used is formed by transferring the fine concave-convex structure on the surface of the oxide film, and has a plurality of convex portions 46 made of the cured substance of the active energy ray-curable resin composition.

The fine concave-convex structure is preferably a so-called moth-eye structure in which a plurality of protrusions (convex portions) having a substantially conic shape, a pyramid shape or the like is arrayed. It is known that the moth-eye structure in which the interval between the protrusions is the wavelength of visible light or less is effective antireflection means since the refractive index continuously increases from the refractive index of the air to the refractive index of the material.

The average interval between the convex portions is preferably the wavelength of visible light or less, that is, 400 nm or less. In a case in which the convex portions are formed using the stamper of the invention, since the average interval between the convex portions becomes approximately 100 nm, the average interval is more preferably 200 nm or less, and particularly preferably 150 nm or less.

The average interval between the convex portions is preferably 20 nm or more in terms of ease of forming the convex portions.

The average interval between the protrusion portions is obtained by measuring 50 intervals between adjacent convex portions (i.e., the distance from the center of a convex portion to the center of an adjacent convex portion) through electron microscope observation, and averaging the values.

In a case in which the average interval is 100 nm, the height of the convex portion is preferably 80 nm to 500 nm, more preferably 120 nm to 400 nm, and particularly preferably 150 nm to 300 nm. When the height of the convex portion is 80 nm or more, the reflectivity decreases sufficiently, and the wavelength dependency of the reflectivity is small. When the height of the convex portion is 500 nm or less, the abrasion resistance of the convex portion becomes favorable.

The height of the convex portion is a value obtained by measuring the distance between the peak portion of a convex portion and the bottommost portion of a concave portion present between convex portions when observed using an electron microscope at a magnification of 30000 times.

The aspect ratio of the convex portion (the height of the convex portion/the average interval between the convex portions) is preferably 0.5 to 5.0, more preferably 0.8 to 4.5, and particularly preferably 1.2 to 4.0. When the aspect ratio of the convex portion is 0.5 or more, the article is sufficiently useful as a superhydrophilic film or super water-repellent film. When the aspect ratio of the convex portion is 5.0 or less, the abrasion resistance of the convex portion becomes favorable.

The shape of the convex portion is preferably a shape in which the cross-sectional area of a convex portion in a direction intersecting the height direction continuously increases from the outermost surface in the depth direction, that is, a triangle shape, a trapezoidal shape, a bell shape or the like in the cross-sectional shape in the height direction of the convex portion.

In the case of the antiretlection article, the difference between the refractive index of the cured resin layer 44 and the refractive index of the film 42 is preferably 0.2 or less, more preferably 0.1 or less, and particularly preferably 0.05 or less. When the difference of the refractive index is 0.2 or less, reflection at the interface between the cured resin layer 44 and the film 42 is suppressed.

In a case in which a fine concave-convex structure is present on the surface, it is known that, when the surface is formed of a hydrophobic material, super water repellency can be obtained due to the lotus effect, and, when the surface is formed of a hydrophilic material, superhydrophilicity can be obtained.

In a case in which the material of the cured resin layer 44 is hydrophobic, the water contact angle on the surface of the fine concave-convex structure is preferably 90° or more, more preferably 110° or more, and particularly preferably 120° or more. When the water contact angle is 90° or more, the attachment of water contaminants becomes difficult, and therefore antifouling properties sufficiently develop. In addition, since water is not easily attached, suppression of ice adhesion can be expected.

In a case in which the material of the cured resin layer 44 is hydrophilic, the water contact angle on the surface of the fine concave-convex structure is preferably 25° or less, more preferably 23° or less, and particularly preferably 21° or less. When the water contact angle is 25° or less, since contaminants attached to the surface are washed out with water, and the attachment of oil contaminants becomes difficult, antifouling properties sufficiently develop. The water contact angle is preferably 3° or more since the deformation of the fine concave-convex structure due to the water absorption of the cured resin layer 44 and a consequent increase in the reflectivity are suppressed.

(Active Energy Ray-Curable Resin Composition)

The active energy ray-curable resin composition includes a polymerizable compound and a polymerization initiator.

Examples of the polymerizable compound include monomers, oligomers, reactive polymers and the like which have radical polymerizable bonds and/or cationic polymerizable bonds in the molecules.

Examples of the monomers having radical polymerizable bonds include monofunctional monomers and polyfunctional monomers.

Examples of the monofunctional monomers include (meth)acrylate derivatives, such as methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)acrylate, phenoxyethyl(meth)acrylate, isobonyl(meth)acrylate, glycidyl(meth)acrylate, tetrahydrofurfuryl(meth)acrylate, aryl(meth)acrylate, 2-hydroxyethyl(meth)acrylate, hydroxypropyl(meth)acrylate, 2-methoxyethyl(meth)acrylate and 2-ethoxyethyl(meth)acrylate; (meth)acrylic acid, (meth)acrylonitrile; styrene derivatives, such as styrene and α-methylstyrene; (meth)acryl amide derivatives, such as (meth)acryl amide, N-dimethyl(meth)acrylamide, N-diethyl(meth)acrylamide and dimethylaminopropyl(meth)acrylamide; and the like. The monofunctional monomers may be used solely, or two or more thereof may be jointly used.

Examples of the polyfunctional monomers include difunctional monomers, such as ethylene glycol di(meth)acrylate, tripropylene glycol di(meth)acrylate, ethylene oxide-denatured di(meth)acrylate isocyanulate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxy polyethoxyphenyl)propane, 2,2-bis(4-(meth)acryloxy ethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, ethylene oxide adduct di(meth)acrylate of bisphenyl A, propylene oxide adduct di(meth)acrylate of bisphenol A, neopentyl glycol hydroxypivalate di(meth)acrylate, divinylbenzene and methylenebisacrylamide; trifunctional monomers, such as pentaerythritol tri(meth)acrylate, trimethylolpropane tri(meth)acrylate, trimethylolpropane ethylene oxide-denatured tri(meth)acrylate, trimethylolpropane propylene oxide-denatured triacrylate, trimethylolpropane ethylene oxide-denatured triacrylate and ethylene oxide-denatured tri(meth)acrylate isocyanulate; tetrafunctional or more monomers, such as condensation reaction mixtures of succinic acid/trimethylolethane/acrylic acid, dipentaerythritol hexa(meth)acrylate, dipentaerythritol penta(meth)acrylate, ditrimethylol propantetraacrylate and tetramethylolmethane tetra(meth)acrylate; difunctional or more urethane acrylate, difunctional or more polyester acrylate and the like. The polyfunctional monomers may be used solely, or two or more thereof may be jointly used.

Examples of the monomers having cationic polymerizable bonds include monomers having epoxy groups, oxetanyl groups, oxazolyl groups, vinyloxy groups or the like, and monomers having epoxy groups are particularly preferable.

Examples of the oligomers or reactive polymers include unsaturated polyesters, such as condensates of unsaturated dicarboxylic acid and polyvalent alcohol; polyester(meth)acrylate, polyether(meth)acrylate, polyol(meth)acrylate, epoxy(meth)acrylate, urethane(meth)acrylate, cationic polymerization-type epoxy compounds, sole or copolymerized polymers of the above monomers having a radical polymerizable bond in the side chain, and the like.

In a case in which a light curing reaction is used, examples of the photopolymerization initiator include carbonyl compounds, such as benzoin, benzoin methyl ether, benzoin ethyl ether, benzoin isopropyl ether, benzoin isobutyl ether, benzyl, benzophenone, p-methoxy benzophenone, 2,2-diethoxy acetophenone, α,α-dimethoxy-α-phenylacetophenone, methyl phenyl glyoxylate, ethyl phenyl glyoxylate, 4,4'-bis(dimethylamino)benzophenone and 2-hydroxy-2-methyl-1-phenylpropane-1-ol; sulfur compounds, such as tetramethylthiuram sulfide and tetramethylthiuram disulfide; 2,4,6-trimethyl benzoyl diphenyl phosphine oxide, benzoyl diethoxy phosphine oxide, and the like. The photopolymerization initiator may be used solely, or two or more thereof may be jointly used.

In a case in which an electron ray curing reaction is used, examples of the polymerization initiator include thioxanthones, such as benzophenone, 4,4-bis(diethylamino)benzophenone, 2,4,6-trimethylbenzophenone, methyl ortho benzoyl benzoate, 4-phenyl benzophenone, t-butyl anthraquinone, 2-ethylanthraquinone, 2,4-diethylthioxantone, isopropylthioxantone and 2,4-dichlorothioxantone; acetophenones, such as diethoxy acetophenone, 2-hydroxy-2-methyl-1-phenyl-propane-1-on, benzyldimethylketal, 1-hydroxy cyclohexyl-phenyl ketone, 2-methyl-2-monopholino(4-thiomethylphenyl)propane-1-on and 2-benzyl-2-dimethylamino-1-(4-monoholinophenyl)-butanone; benzoin ethers, such as benzoin methyl ether, benzoin ethyl ether, benzoin isopropyl ether and benzoin isobutyl ether; acyl phosphine oxides, such as 2,4,6-trimethyl benzoyl diphenyl phosphine oxide, bis(2, 6-dimethoxy benzoyl)-2,4,4-trimethyl pentyl phosphine oxide, bis(2,4,6-trimethylbenzoyl)-phenyl phosphine oxide; methyl benzoylformate, 1,7-bisacridinyl heptane, 9-phenylacridine, and the like. The polymerization initiator may be used solely, or two or more thereof may be jointly used.

In a case in which a thermal curing reaction is used, examples of the thermal polymerization initiator include organic peroxides, such as methyl ethyl ketone peroxide, benzoyl peroxide, dicumyl peroxide, t-butyl hydroperoxide, cumene hydroperoxide, t-butyl peroxy octoate, t-butyl peroxy benzoate and lauroyl peroxide; azo-based compounds, such as azobisisobutylonitrile; redox polymerization initiators obtained by combining an amine, such as N,N-dimethylanilne or N,N-dimethyl-p-toluidine, into the above organic peroxide; and the like.

The amount of the polymerization initiator is preferably 0.1 parts by mass to 10 parts by mass with respect to 100 parts by mass of the polymerizable compound. When the amount of the polymerization initiator is less than 0.1 parts by mass, polymerization does not easily proceed. When the amount of the polymerization initiator exceeds 10 parts by mass, there are cases in which the cured film is colored or the mechanical strength decreases.

The active energy ray-curing resin composition may also include an unreactive polymer, an active energy ray sol-gel reactive composition, an antistatic agent, additives such as a fluorine compound for improving antifouling properties, fine particles and a small amount of a solvent as necessary.

Examples of the unreactive polymer include an acryl-based resin, a styrene-based resin, polyurethane, a cellulose-based resin, polyvinyl butyral, polyester, a thermoplastic elastomer, and the like.

Examples of the active energy ray sol-gel reactive composition include an alkoxysilane compound, an alkyl silicate compound, and the like.

Examples of the alkoxysilane compound include tetramethoxysilane, tetra-i-propoxysilane, tetra-n-propoxysilane, tetra-n-butoxysilane, tetra-sec-butoxysilane, tetra-t-butoxysilane, methyl triethoxysilane, methyl tripropoxysilane, methyl tributoxysilane, dimethyl dimethoxysilane, dimethyl diethoxysilane, trimethyl ethoxysilane, trimethyl methoxysilane, trimethyl propoxysilane, trimethyl butoxysilane, and the like.

Examples of the alkyl silicate compound include methyl silicate, ethyl silicate, isopropyl silicate, n-propyl silicate, n-butyl silicate, n-pentyl silicate, acetyl silicate, and the like.

(Hydrophobic Material)

In order to set the water contact angle on the surface of the fine concave-convex structure of the cured resin layer to 90° or more, a composition including a fluorine-containing compound or a silicone-based compound is preferably used as the active energy ray-curing resin composition which can form a hydrophobic material.

Fluorine-Containing Compound:

Examples of the fluorine-containing compound include a fluorine-containing monomer, a fluorine-containing silane coupling agent, a fluorine-containing surfactant, a fluorine-containing polymer and the like.

Examples of the fluorine-containing monomer include a fluoroalkyl group-substituted vinyl monomer, a fluoroalkyl group-substituted ring-opening polymerizable monomer and the like.

Examples of the fluoroalkyl group-substituted vinyl monomer include fluoroalkyl group-substituted (meth)acrylate, fluoroalkyl group-substituted (meth)acrylamide, fluoroalkyl group-substituted vinyl ether, fluoroalkyl group-substituted styrene, and the like.

Examples of the fluoroalkyl group-substituted ring-opening polymerizable monomer include a fluoroalkyl group-substituted epoxy compound, a fluoroalkyl group-substituted oxetane compound, a fluoroalkyl group-substituted oxazoline compound, and the like.

Examples of the fluorine-containing silane coupling agent include 3,3,3-trifluoropropyl trimethoxysilane, 3,3,3-trifluoropropyl triacetoxysilane, dimethyl-3,3,3-trifluoropropyl methoxysilane, tridecafluoro-1,1,2,2-tetrahydrooctyl triethoxysilane, and the like.

Examples of the fluorine-containing surfactant include a fluoroalkyl group-containing anionic surfactant, a fluoroalkyl group-containing cationic surfactant and the like.

Examples of the fluorine-containing polymer include a polymer of a fluoroalkyl group-containing monomer, a copolymer of a fluoroalkyl group-containing monomer and a poly(oxyalkylene) group-containing monomer, a copolymer of a fluoroalkyl group-containing monomer and a cross-linking reactive group-containing monomer, and the like. The fluorine-containing polymer may be a copolymer with other copolymerizable monomer.

Silicone-Based Compound:

Examples of the silicone-based compound include (meth)acrylic acid-denatured silicone, a silicone resin, a silicone-based silane coupling agent, and the like.

Examples of the (meth)acrylic acid-denatured silicone include silicone (di)(meth)acrylate and the like, and, for example, silicone diacrylate "x-22-164", "x-22-1602" and the like, which are manufactured by Shin-Etsu Chemical Co., Ltd., are preferably used.

(Hydrophilic Material)

In order to set the water contact angle on the surface of the fine concave-convex structure of the cured resin layer to 25° or less, a composition including at least a hydrophilic monomer is preferably used as the active energy ray-curing resin composition which can form a hydrophilic material. In addition, from the viewpoint of the supply of abrasion resistance or water resistance, a composition including a cross-linkable polyfunctional monomer is more preferable. Meanwhile, the hydrophilic monomer and the cross-linkable polyfunctional monomer may be the same (that is, a hydrophilic polyfunctional monomer). Furthermore, the active energy ray-curing resin composition may include other monomers.

As the active energy ray-curing resin composition which can form a hydrophilic material, a composition including tetrafunctional or more polyfunctional (meth)acrylate, difunctional or more hydrophilic (meth)acrylate, and a monofunctional monomer as necessary is more preferably used.

Examples of the tetrafunctional or more polyfunctional (meth)acrylate include ditrimethylol propane tetra(meth)acrylate, pentaerythritol tetra(meth)acrylate, pentaerythritol ethoxy tetra(meth)acrylate, dipentaerythritol hydroxyl penta(meth)acrylate, dipentaerythritol hexa(meth)acrylate, a condensation reaction mixture of succinic acid/trimethylolethane/acrylic acid at a molar ratio of 1:2:4, urethane acrylates (EBECRYL220, EBECRYL1290, EBECRYL1290K, EBECRYL5129, EBECRYL8210, EBECRYL8301 and KRM8200 manufactured by Daicel-Cytec Company Ltd.), polyether acrylates (EBECRYL81 manufactured by Daicel-Cytec Company Ltd.), denatured epoxy acrylates (EBECRYL3416 manufactured by Daicel-Cytec Company Ltd.), polyester acrylates (EBECRYL450, EBECRY657, EBE- CRYL800, EBECRYL810, EBECRYL811. EBECRYL812, EBECRYL1830, EBECRYL845, EBECRYL846 and EBECRYL1870 manufactured by Daicel-Cytec Company Ltd.) and the like. The tetrafunctional or more polyfunctional (meth)acrylate may be used solely, or two or more thereof may be jointly used.

As the tetrafunctional or more polyfunctional (meth)acrylate, pentafunctional or more polyfunctional (meth)acrylate is more preferable.

The fraction of the tetrafunctional or more polyfunctional (meth)acrylate is preferably 10 mass % to 90 mass %, more preferably 20 mass % to 90 mass %, and particularly preferably 30 mass % to 90 mass % with respect to the total of all monomers that configure the active energy ray-curing resin composition. When the fraction of the tetrafunctional or more polyfunctional (meth)acrylate is 10 mass % or more, the elastic modulus increases so that the abrasion resistance improves. When the fraction of the tetrafunctional or more polyfunctional (meth)acrylate is 90 mass % or less, small cracks are not easily caused on the surface, and the appearance does not easily become poor.

Examples of the difunctional or more hydrophilic (meth)acrylate include polyfunctional acrylates having long-chain polyethylene glycol, such as ARONIX M-240, ARONIX M260 (manufactured by Toagosei Co., Ltd.), NK ESTER AT-20E, NK ESTER ATM-35E (manufactured by Shin-Nakamura Chemical Co., Ltd.), polyethylene glycol dimethacrylate and the like. The difunctional or more hydrophilic (meth)acrylate may be used solely, or two or more thereof may be jointly used.

In polyethylene glycol dimethacrylate, the total of the average repetition unit of polyethylene glycol chains present in a molecule is preferably 6 to 40, more preferably 9 to 30, and particularly preferably 12 to 20. When the average repetition unit of the polyethylene glycol chains is 6 or more, the hydrophilicity becomes sufficient, and the antifouling properties improve. When the average repetition unit of the polyethylene glycol chains is 40 or less, the compatibility with tetrafunctional or more polyfunctional (meth)acrylate becomes favorable, and the active energy ray-curing resin composition is not easily separated.

The fraction of the difunctional or more hydrophilic (meth)acrylate is preferably 3 mass % to 90 mass %, and more preferably 3 mass % to 70 mass % with respect to the total of all monomers that configure the active energy ray-curing resin composition. When the fraction of the difunctional or more hydrophilic (meth)acrylate is 3 mass % or more, the hydrophilicity becomes sufficient so that the antifouling properties improve. When the fraction of the difunctional or more hydrophilic (meth)acrylate is 90 mass % or less, the elastic modulus increases so that the abrasion resistance improves.

As the monofunctional monomer, a hydrophobic monofunctional monomer is preferable.

Examples of the hydrophilic monofunctional monomer include monofunctional (meth)acrylate having a polyethylene glycol chain in an ester group, such as M-20G, M-90G and M-230G (manufactured by Shin-Nakamura Chemical Co., Ltd.), monofunctional (meth)acrylate having a hydroxyl group in an ester group, such as hydroxy alkyl(meth)acrylate, monofunctional acrylamides, cationic monomers, such as methacryl amide propyl trimethyl ammonium methyl sulfate and methacryloyloxy ethyl trimethyl ammonium methyl sulfate, and the like.

In addition, as the monofunctional monomer, a viscosity adjuster, such as acryloylmorphorine or vinyl pyrrolidone, an adhesion improver, such as acryloylisocyanates, which improves the adhesion to the article main body, and the like may be used.

The fraction of the monofunctional monomer is preferably 0 mass % to 20 mass %, and more preferably 5 mass % to 15 mass % with respect to the total of all monomers that configure the active energy ray-curing resin composition. The use of the monofunctional monomer improves the adhesion between the base material and the curing resin. When the fraction of the monofunctional monomer is 20 mass % or less, the antifouling properties or abrasion resistance sufficiently develops without the lacking of the tetrafunctional or more polyfunctional (meth)acrylate or difunctional or more hydrophilic (meth)acrylate.

The monofunctional monomer may be blended in the active energy ray-curing resin composition as a polymer having a low degree of polymerization, which is obtained by (co)polymerizing one or two or more monomers, at 0 parts by mass to 35 parts by mass. Examples of the polymer having a low degree of polymerization include a 40/60 copolymerized oligomer (MG polymer, manufactured by MRC Unitec Co., Ltd.) of a monofunctional (meth)acrylate having a polyethylene glycol chain in an ester group, such as M-230G (manufactured by Shin-Nakamura Chemical Co., Ltd.), and methacryl amide propyl trimethyl ammonium methyl sulfate, and the like.

(Use)

Examples of the use of the article 40 include an antireflection article, an antifogging article, an antifouling article and a water-repellent article, and more specific examples thereof include antireflection for display, an automobile meter cover, an automobile mirror, an automobile window, a light extraction efficiency-improving member of an organic or inorganic electroluminescence, a solar cell member, and the like.

(Action Effects)

In the method for manufacturing an article of the invention described above, since the fine concave-convex structure on the surface of the stamper of the invention, in which the emergence of the pattern derived from the traces of crystal grains on the surface of the oxide film is suppressed, is transferred to the surface of the transparent base material, an article having a favorable appearance can be manufactured.

EXAMPLES

In the following manufacturing examples and comparative manufacturing examples, the obtained worked articles, that is, aluminum base materials are etched using an etching solution of $HCl:HNO_3:HF=75:25:5$, and are subjected to evaluation.

The quadrature method was used as the evaluation method regarding the crystal grain size. Secondary phase particles were directly observed using an EPMA, and the evaluation was performed using the number of the particles and the area rates. Regarding the heterogeneity of crystal orientations, the observation of the etched appearances and a method using the degree of luster were jointly performed. The difference in the crystal orientation appears as the difference in the melting rates during etching, and appears as concaves and convexities after etching. In a case in which crystal grains are fine and homogeneous, and the crystal orientations are random, since fine concaves and convexities are generated due to etching, scattered reflection occurs, and the degree of luster decreases.

Manufacturing Example 1

Ti (316 ppm) was added to and melted in aluminum having a purity of 99.98%. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. During the casting, a miniaturizing agent (Al-5% Ti-1% B) was continuously added to the molten metal flowing into the mold so that the ratio per 1 ton of the molten metal becomes 0.15 kg, and an ingot having a purity of aluminum of 99.94%, a content of Ti of 324 ppm, a content of B of 7 ppm, a content of Fe of 83 ppm, and a total content of other impurities of 140 ppm was obtained.

A 508 mm×260 mm×213 mm piece was cut out from the ingot, and used as a forged material later on.

The forged material was heated to 414° C., the first turn of hot forging of a (⅔U–1.5S)×3 cycle was performed and ended at 281° C. Subsequently, the cast material was heated again to 386° C., the second turn of hot forging of the (⅔U–1.5S)×3 cycle was performed and ended at 277° C.

After the material was cooled to 17° C., cold forging of (⅔U–1.5S)×2 cycle–0.56U––2S was performed so as to obtain a forged ingot having a shape of φ240 mm×600 mL, and ended at 143° C.

The forged ingot was annealed at 340° C. for 60 minutes, a φ240 mm×20 mL piece was cut out, and milling was performed in order to flatten the cut surface.

After that, the polished surface was confirmed using an EPMA, which showed that the area rate of secondary phase particles was 0.03%, and the number of particles were as small as 118 particles/mm².

The obtained worked article was etched using an etching solution of HCl:HNO₃:HF=75:25:5, and was subjected to a variety of evaluations. The evaluation results are described in Table 4.

Figure 3A:
FIG. 3A-3F illustrate photographs of metallic structures illustrating the states of the crystal grains in ingots in examples and comparative examples.

Since the crystal grains were miniaturized during the casting, and hot forging and cold forging were combined, the heterogeneity of the crystal orientations was not observed, and the average of the degree of luster was 8.9. The actual article is illustrated in FIG. 3A. In addition, the average crystal grain diameter was as fine as 49 μm.

Manufacturing Example 2

Ti (316 ppm) was added to and melted in aluminum having a purity of 99.98%. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. During the casting, a miniaturizing agent (Al-5% Ti-1% B) was continuously added to the molten metal flowing into the mold so that the ratio per 1 ton of the molten metal becomes 0.15 kg, and an ingot having a purity of aluminum of 99.94%, a content of Ti of 324 ppm, a content of B of 7 ppm, a content of Fe of 83 ppm, and a total content of other impurities of 140 ppm was obtained.

A 508 mm×260 mm×213 mm piece was cut out from the ingot, and used as a forged material later on.

Hot forging was not performed, cold forging of (⅔U–1.5S)×2 cycle–0.56U–2S was performed from a state in which the material was at 15° C. so as to obtain a forged ingot having a shape of φ240 mm×600 mL, and ended at 135° C.

The forged ingot was annealed at 340° C. for 60 minutes, a φ240 mm×20 mL piece was cut out, and milling was performed in order to flatten the cut surface.

After that, the polished surface was confirmed using an EPMA, which showed that the area rate of secondary phase particles was 0.03%, and the number of particles was as small as 120 particles/mm².

The obtained worked article was etched using an etching solution of HCl:HNO₃:HF=75:25:5, and was subjected to a variety of evaluations. The evaluation results are described in Table 4.

Figure 3B:
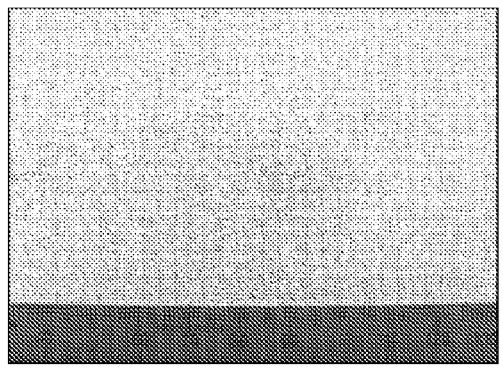

Since the crystal grains were miniaturized during the casting, the heterogeneity of the crystal orientations was not observed, and the degree of luster was not as favorable as in Manufacturing example 1, but was 13.7. The actual article is illustrated in FIG. 3B. In addition, the average crystal grain diameter was as sufficiently fine as 52 μm.

Manufacturing Example 3

Ti (316 ppm) was added to and melted in aluminum having a purity of 99.98%. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. During the casting, a miniaturizing agent (Al-5% Ti-0.25% C) was continuously added to the molten metal flowing into the mold so that the ratio per 1 ton of the molten metal becomes 0.28 kg, and an ingot having a purity of aluminum of 99.94%, a content of Ti of 330 ppm, a content of C of 2 ppm, a content of Fe of 83 ppm, and a total content of other impurities of 140 ppm was obtained.

A 508 mm×260 mm×213 mm piece was cut out from the ingot, and used as a forged material later on.

Hot forging was not performed, cold forging of (⅔U–1.5S)×2 cycle–0.56U–2S was performed from a state in which the material was at 15° C. so as to obtain a forged ingot having a shape of φ240 mm×600 mL, and ended at 135° C.

The forged ingot was annealed at 340° C. for 60 minutes, a φ240 mm×20 mL piece was cut out, and milling was performed in order to flatten the cut surface.

After that, the polished surface was confirmed using an EPMA, which showed that the area rate of secondary phase particles was 0.03%, and the number of particles was as small as 123 particles/mm².

The obtained worked article was etched using an etching solution of HCl:HNO₃:HF=75:25:5, and was subjected to a variety of evaluations. The evaluation results are described in Table 4.

Since the crystal grains were miniaturized during the casting, the heterogeneity of the crystal orientations was not observed, and the degree of luster was not as favorable as in Manufacturing example 1, but was 11.0. In addition, the average crystal grain diameter was as sufficiently fine as 51 μm.

Comparative Manufacturing Example 1

Aluminum having a purity of 99.9% was melted without adding Ti. The molten metal was cast into a 3850 mm-long ingot using a 508 mm-thick×1110 mm-wide DC casting mold under the casting conditions of a casting temperature of 680° C., a casting rate of 50 mm/min, an amount of cooling water of 315 L/min/1 m of the mold length. During the casting, a miniaturizing agent (Al-5% Ti-1% B) was continuously added to the molten metal flowing into the mold so that the ratio per 1 ton of the molten metal becomes 3.60 kg, and an ingot having a purity of aluminum of 99.9%, a content of Ti of 75 ppm, a content of B of 7 ppm, a content of Fe of 501 ppm, and a total content of other impurities of 487 ppm was obtained.

A 508 mm×500 mm×500 mm piece was cut out from the ingot, and used as a forged material later on.

The forged material was heated to 380° C., the first turn of hot forging of 2.97S was performed and ended at 350° C. Subsequently, the cast material was heated again to 380° C., then, the second turn of hot forging of the (½–2S)×2 cycle was performed and ended at 320° C.

After the material was cooled to room temperature, cold forging of (½–2S)×2 cycle was performed so as to obtain a forged ingot having a shape of φ230 mm×3060 mL. The forged ingot was annealed at 340° C. for 60 minutes, a φ230 mm×20 mL piece was cut out from the ingot, and milling and polishing were performed in order to flatten the cut surface.

After that, the polished surface was confirmed using an EPMA, which showed that the area rate of secondary phase particles, which were caused by 501 ppm of Fe and 484 ppm of impurities other than Fe, Ti and B, was 0.20%, and the number of particles became 832 particles/mm$^2$, which was larger than in Manufacturing examples 1 and 2.

Figure 3C:
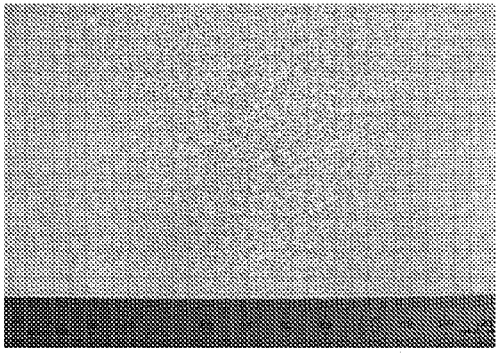

In addition, as a result of etching using an etching solution of HCl:HNO$_3$:HF=75:25:5, since the miniaturizing agent was added during casting, the heterogeneity of the crystal orientations was not observed, and the degree of luster was 4.4. The actual article is illustrated in FIG. 3C. The reason why the heterogeneity was not observed in spite of a lower content of Ti than in Manufacturing examples 1 and 2 is that the cast structure is miniaturized only by the miniaturizing agent. The average crystal grain diameter was as sufficiently fine as 41 μm. However, the crystal grains were fine and homogenous, and the crystal orientations were random, but a large number of secondary phase particles were present.

Comparative Manufacturing Example 2

Aluminum having a purity of 99.95% was melted. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. At this time, a miniaturizing agent was not injected, and an ingot having a purity of aluminum of 99.95%, a content of Ti of 1 ppm, a content of B of 9 ppm, a content of Fe of 161 ppm, and a total content of other impurities of 319 ppm was obtained.

A 300 mm×300 mm×300 mm piece was cut out from the ingot, and used as a forged material later on.

The forged material was heated to 414° C., the first turn of hot forging of (2S–½)×2 cycle was performed and ended at 354° C. Subsequently, the cast material was heated again to 393° C., then, the second turn of hot forging of the (2S–½)×2 cycle was performed and ended at 323° C.

After the material was cooled to 32° C., cold forging of (2S–½)×2 cycle was performed so as to obtain a forged ingot having a shape of 300 mmT×250 mmW×360 mmL, and ended at 144° C. The forged ingot was annealed at 340° C. for 60 minutes, a 300 mmT×200 mmW×20 mL piece was cut out from the ingot, and milling and polishing were performed in order to flatten the cut surface.

After that, the polished surface was confirmed using an EPMA, which showed that the area rate of secondary phase particles, which were caused by 161 ppm of Fe and 319 ppm of impurities other than Fe, Ti and B, was 0.08%, and the number of particles became 169 particles/mm$^2$, which indicates that the number of secondary phase particles were reduced more than in Comparative manufacturing example 1.

Figure 3D:
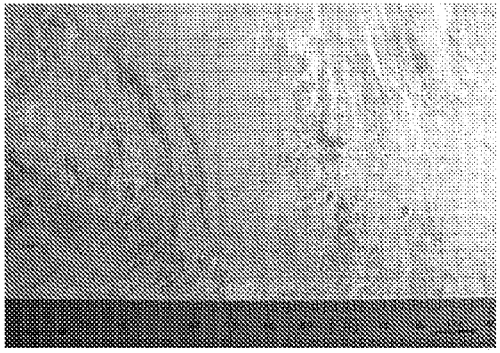

In addition, as a result of etching using an etching solution of HCl:HNO$_3$:HF=75:25:5, since the miniaturizing agent was not added during casting, the heterogeneity of the crystal orientations was observed, and the degree of luster was 27.3. The actual article is illustrated in FIG. 3D. In addition, the average crystal grain diameter was as sufficiently fine as 40 μm.

Comparative Manufacturing Example 3

Aluminum having a purity of 99.99% was melted. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. At this time, a miniaturizing agent was not injected, and an ingot having a purity of aluminum of 99.99%, a content of Ti of 0 ppm, a content of B of 0 ppm, a content of Fe of 15 ppm, and a total content of other impurities of 84 ppm was obtained.

A 300 mm×300 mm×300 mm piece was cut out from the ingot, and used as a forged material later on.

The forged material was heated to 420° C., the first turn of hot forging of (2S–½)×2 cycle was performed and ended at 360° C. Subsequently, the cast material was heated again to 423° C., then, the second turn of hot forging of the (2S–½)×2 cycle was performed and ended at 356° C.

After the material was cooled to 31° C., cold forging of (2S–½)×2 cycle was performed so as to obtain a forged ingot having a shape of 300 mmT×250 mmW×360 mmL, and ended at 128° C. The forged ingot was annealed at 340° C. for 60 minutes, a 300 mmT×200 mmW×20 mmL piece was cut out from the ingot, and milling and polishing were performed in order to flatten the cut surface.

After that, the polished surface was confirmed using an EPMA, which showed that the area rate of secondary phase particles, which were caused by 15 ppm of Fe and 84 ppm of impurities other than Fe, Ti and B, was 0.01%, and the number of particles became 57 particles/mm$^2$, which indicates that the number of secondary phase particles were reduced more than in Comparative manufacturing example 3.

Figure 3E:
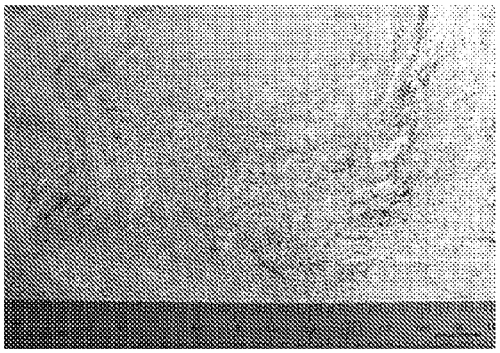

In addition, as a result of etching using an etching solution of HCl:HNO$_3$:HF=75:25:5, since the miniaturizing agent was not added during casting, the heterogeneity of the crystal orientations was observed, and the degree of luster was 50.4. The actual article is illustrated in FIG. 3E.

However, since the amount of impurities were reduced, crystal grain growth became liable to occur during the annealing after the cold forging, and the average crystal grain diameter began to become as coarse as 86 μm.

Comparative Manufacturing Example 4

Aluminum having a purity of 99.98% was melted. The molten metal was cast into a 3850 mm-long ingot using a 508 mm-thick×1110 mm-wide DC casting mold under the casting conditions of a casting temperature of 680° C., a casting rate of 52 mm/min, an amount of cooling water of 230 L/min/1 m of the mold length. At this time, a miniaturizing agent was not injected, and an ingot having a purity of aluminum of 99.99%, a content of Ti of 1 ppm, a content of B of 6 ppm, a content of Fe of 83 ppm, and a total content of other impurities of 150 ppm was obtained.

A 480 mm×480 mm×480 mm piece was cut out from the ingot, and used as a forged material later on.

The forged material was heated to 412° C., the first turn of hot forging of (⅔U–1.5S)×3 cycle was performed and ended at 308° C. Subsequently, the cast material was heated again to 379° C., then, the second turn of hot forging of the (⅔U–1.5S)×3 cycle was performed and ended at 318° C.

After the material was cooled to 19° C., the first turn of cold forging of (⅔U–1.5S)×2 cycle–⅔U was performed, and ended at 120° C. Subsequently, since there was a possibility that the material might reach more than 150° C. due to heat generation caused by cold forging, cooling was performed again so as to cool the material to 40° C., the second turn of cold forging of 5.72S was performed, and ended at 132° C. Subsequently, since there was a possibility that the material might reach more than 150° C. due to heat generation caused by cold forging, cooling was performed again so as to cool the material to 21° C., then, the third turn of cold forging of 1.28S was performed so as to obtain a forged ingot having a shape of φ245 mm×2350 mL, and ended at 51° C.

The forged ingot was annealed at 340° C. for 60 minutes, a φ240 mm×20 mL piece was cut out from the ingot, and milling and polishing were performed in order to flatten the cut surface.

Figure 3F:
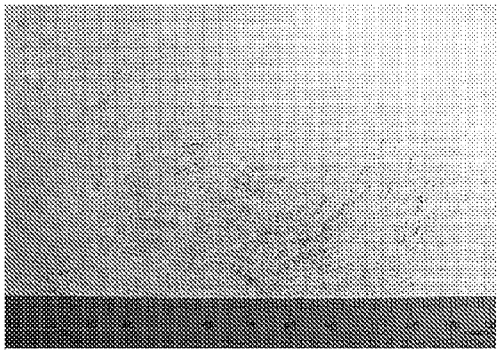

After that, as a result of etching using an etching solution of HCl:HNO₃:HF=75:25:5, since the heterogeneity of the crystal orientations was slightly reduced by increasing the number of times of upsetting and extend forging during casting. But the degree of luster became 28.9, and the heterogeneity was insufficiently reduced compared to in Manufacturing examples 1 and 2, in which Ti was added, considering the degree of an increase in man-hours. The actual article is illustrated in FIG. 3F. In addition, the average crystal grain diameter was as sufficiently fine as 35 μm.

For the above Manufacturing examples and Comparative manufacturing examples, Tables 1 to 4 describe the component compositions of the materials of the respective examples, the manufacturing conditions, and the evaluation results of the forged articles and annealed articles.

As is evident from the tables, it is found that all of the heterogeneity of the orientations, the degree of luster and the crystal grain size clear the regulations in Manufacturing examples 1 and 2.

TABLE 1

| | | Impurities (ppm) | | | | | |
|---|---|---|---|---|---|---|---|
| No. | Purity (%) | Total | Fe | Ti | B | C | Total of other than Fe, Ti, B and C |
| Manufacturing example 1 | 99.94 | 554 | 83 | 324 | 7 | — | 140 |
| Manufacturing example 2 | 99.94 | 554 | 83 | 324 | 7 | — | 140 |
| Manufacturing example 3 | 99.94 | 554 | 83 | 330 | — | 2 | 140 |
| Comparative manufacturing example 1 | 99.89 | 1070 | 501 | 75 | 7 | — | 487 |
| Comparative manufacturing example 2 | 99.95 | 490 | 161 | 1 | 9 | — | 319 |
| Comparative manufacturing example 3 | 99.99 | 100 | 15 | 0 | 0 | — | 84 |
| Comparative manufacturing example 4 | 99.98 | 240 | 83 | 1 | 6 | — | 150 |

TABLE 2

| | Casting | | | First turn of hot forging | | Second turn of hot forging | |
|---|---|---|---|---|---|---|---|
| No. | Temperature (° C.) | Rate (mm/min) | Amount of cooling water (L/min/1 m) | Method | Temperature (° C.) | Method | Temperature (° C.) |
| Manufacturing example 1 | 680 | 52 | 230 | (2/3U-1.5S) × 3 cycle | 414→281 | (2/3U-1.5S) × 3 cycle | 386→277 |
| Manufacturing example 2 | 680 | 52 | 230 | None | — | None | — |
| Manufacturing example 3 | 680 | 52 | 230 | None | — | None | — |
| Comparative manufacturing example 1 | 680 | 50 | 315 | 2.97S | 380→350 | (1/2U-2S) × 2 cycle | 380→320 |
| Comparative manufacturing example 2 | 680 | 52 | 230 | (2S-1/2U) × 2 cycle | 414→354 | (2S-1/2U) × 2 cycle | 393→323 |
| Comparative manufacturing example 3 | 680 | 52 | 230 | (2S-1/2U) × 2 cycle | 420→360 | (2S-1/2U) × 2 cycle | 423→356 |
| Comparative manufacturing example 4 | 680 | 52 | 230 | (2/3U-1.5S) × 3 cycle | 412→308 | (2/3U-1.5S) × 3 cycle | 379→318 |

TABLE 3

| | First turn of cold forging | | Second turn of cold forging | | Third turn of cold forging | | |
|---|---|---|---|---|---|---|---|
| No. | Method | Temperature (° C.) | Method | Temperature (° C.) | Method | Temperature (° C.) | Annealing (° C. × min) |
| Manufacturing example 1 | (2/3U-1.5S) × 2 cycle-0.56U-2S | 17→143 | None | — | None | — | 340 × 60 |
| Manufacturing example 2 | (2/3U-1.5S) × 2 cycle-0.56U-2S | 15→135 | None | — | None | — | 340 × 60 |

TABLE 3-continued

| | First turn of cold forging | | Second turn of cold forging | | Third turn of cold forging | | |
|---|---|---|---|---|---|---|---|
| No. | Method | Temperature (° C.) | Method | Temperature (° C.) | Method | Temperature (° C.) | Annealing (° C. × min) |
| Manufacturing example 3 | (2/3U-1.5S) × 2 cycle-0.56U-2S | 15→135 | None | — | None | — | 340 × 60 |
| Comparative manufacturing example 1 | (1/2U-2S) × 2 cycle | — | None | — | None | — | 400 × 60 |
| Comparative manufacturing example 2 | (2S-1/2U) × 2 cycle | 32→144 | None | — | None | — | 340 × 60 |
| Comparative manufacturing example 3 | (2S-1/2U) × 2 cycle | 31→128 | None | — | None | — | 340 × 60 |
| Comparative manufacturing example 4 | (2/3U-1.5S) × 2 cycle-2/3U | 19→120 | 5.72S | 40→132 | 1.28S | 21→51 | 340 × 60 |

TABLE 4

| | | Degree of luster | | | Secondary phase particles | |
|---|---|---|---|---|---|---|
| No. | Metal flow pattern | Ave | σ | Area rate (%) | Number of particles (particles/mm²) | Average crystal grain diameter (μm) |
| Manufacturing example 1 | B | 8.9 | 0.7 | 0.03 | 118 | 49 |
| Manufacturing example 2 | B | 13.7 | 1.2 | 0.03 | 120 | 52 |
| Manufacturing example 3 | B | 11.0 | 1.0 | 0.03 | 123 | 51 |
| Comparative manufacturing example 1 | B | 4.4 | 1.5 | 0.20 | 832 | 41 |
| Comparative manufacturing example 2 | C | 27.3 | 6.3 | 0.08 | 169 | 40 |
| Comparative manufacturing example 3 | C | 50.4 | 11.1 | 0.01 | 57 | 86 |
| Comparative manufacturing example 4 | C | 28.9 | 5.8 | 0.04 | 125 | 35 |

Preparation Example

The respective components were mixed at the fraction described below, and an active energy ray-curing resin composition A was prepared.

A condensation reaction mixture of succinic acid/trimethylolethane/acrylic acid at a molar ratio of 1:2:4; 45 parts by mass, 1.6-hexanediol diacrylate: 45 parts by mass, X-22-1602: a radical polymerizable silicone oil (manufactured by Shin-Etsu Chemical Co., Ltd.,); 10 parts by mass, 1-hydroxycyclohexyl phenyl ketone (manufactured by Ciba Specialty Chemicals Corp., IRGACURE184); 3.0 parts by mass, and Bis(2,4,6-trimethylbenzoyl)-phenylphosphine oxide (manufactured by Ciba Specialty Chemicals Corp., IRGACURE819); 0.2 parts by mass.

Example 1

The aluminum manufactured in Manufacturing example 1 was cut into a cylindrical shape having an outer diameter of 200 mm, an inner diameter of 155 mm and a length of 350 mm, and a mirror cutting process was performed on the surface so that the arithmetic average roughness Ra of the surface to be worked became 0.03 μm or less, thereby obtaining a cylindrical aluminum base material.

Process (a):
Anodizing was performed on the aluminum base material in an aqueous solution of 0.3 M oxalic acid for 30 minutes under the conditions of a bath temperature of 16° C. and a direct current of 40 V, thereby forming an oxide film (thickness: 3 μm).

Process (b):
The aluminum base material on which the oxide film was formed was immersed in a mixed aqueous solution of 6 mass % of phosphoric acid and 1.8 mass % of chromic acid, which were adjusted to 35° C., for 4 hours, thereby melting and removing the formed oxide film.

Process (c):
Anodizing was performed on the aluminum base material again under the same conditions as for the process (a) for 45 seconds, thereby forming an oxide film.

Process (d):
The aluminum base material on which the oxide film was formed was immersed in an aqueous solution of 5 mass % of phosphoric acid (30° C.) for 9 minutes, thereby performing a pore diameter-enlarging treatment which enlarges fine pores in the oxide film.

Process (e):
Anodizing was performed on the aluminum base material again under the same conditions as for the process (a) for 45 seconds.

Process (f):
The processes (d) and (e) were repeated a total of 4 times, and, finally, the process (d) was performed, thereby obtaining a roll-shaped stamper having an oxide film having substantially conical fine pores having an average interval of 100 nm and a depth of 160 nm on the surface.

The roll-shaped stamper obtained in the above manner was installed in a manufacturing apparatus illustrated in FIG. 5, and an article was manufactured in the following manner.

Figure 5:
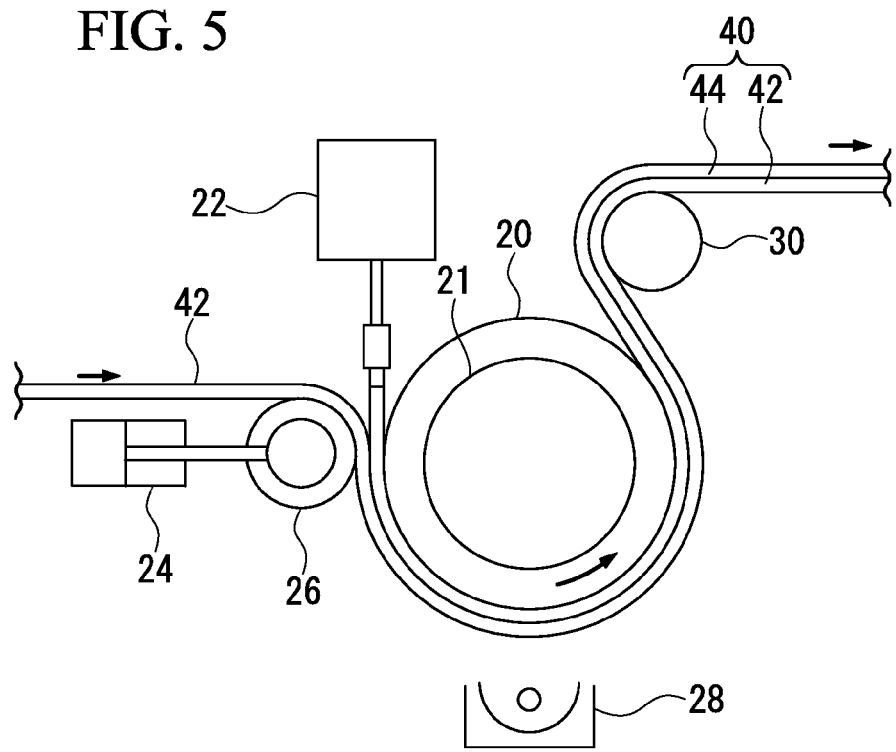
FIG. 5 is a configuration view illustrating an example of an apparatus for manufacturing an article having a fine concave-convex structure on the surface.

As illustrated in FIG. 5, the roll-shaped stamper 20 was embedded in a shaft core 21 which had a flow channel for cooling water provided therein and was made of carbon steel for machine structural use. Next, the active energy ray-curing composition A was supplied onto the film 42 (a polyethylene terephthalate (PET) film, manufactured by Toyobo Co., Ltd., A4300) nipped between the nip roll 26 and the roll-shaped stamper 20 at room temperature through a supply nozzle, from the tank 22. At this time, the film was nipped by the nip roll 26 whose nip pressure was adjusted using the pneumatic cylinder 24 so that the active energy ray-curing composition A was also loaded into the fine pores in the roll-shaped stamper 20.

Ultraviolet rays were irradiated from an active energy ray-irradiating apparatus 28 (240 W/cm ultraviolet ray-irradiating apparatus) in a state in which the active energy ray-curing composition A was sandwiched between the roll-shaped stamper 20 and the film 42 while rotating the roll-shaped stamper 20 at a rate of 7.0 m/minute, the active energy ray-curing composition A was cured so as to form the cured resin layer 44, and then the film 42 having the cured resin layer 44 formed on the surface thereof was separated from the roll-shaped stamper 20 using the separating roll 30, thereby obtaining an article 40 having a fine concave-convex structure made up of a plurality of convex portion 46 having an average interval of 100 nm and a height of 150 nm on the surface.

For the obtained article, the appearances and haze were evaluated. The results are described in Table 5.

Regarding the appearance of the article, it was checked whether an appearance corresponding to a metal flow pattern was visually observed. Articles, in which a pattern corresponding to the traces of crystal grains was not visually observed and the color was slightly varied, were evaluated as A, articles, in which a pattern corresponding to the traces of crystal grains was not visually observed, were evaluated as B, and articles, in which a pattern corresponding to the traces of crystal grains was visually observed, were evaluated as C.

The haze of the article was measured using a haze meter (manufactured by Suga Test Instruments Co., Ltd.), which is based on ES K7361-1. Articles with a haze of 1.5% or more were evaluated as C, and articles with a haze of less than 1.5% were evaluated as B.

Regarding the height of the convex portion, the distance between the peak portion of a convex portion and the bottommost portion of a concave portion present between convex portions was measured when observed using an electron microscope at a magnification of 30000 times.

Example 2

An article 40 having a fine concave-convex structure made up of a plurality of convex portions 46 having an average interval of 100 nm and a height of 200 nm on the surface was obtained using the aluminum manufactured in Manufacturing example 1 and the same method as in Example 1 except that the anodizing was performed for 50 seconds in the process (c), and the pore diameter-enlarging treatment was performed for 8 minutes in the process (d).

For the obtained article, the appearances and haze were evaluated. The results are described in Table 5.

Example 3

An article 40 having a fine concave-convex structure made up of a plurality of convex portions 46 having an average interval of 100 nm and a height of 150 nm on the surface was obtained using the same method as in Example 1 except that the aluminum manufactured in Manufacturing example 2 was used.

For the obtained article, the appearances and haze were evaluated. The results are described in Table 5.

Example 4

An article 40 having a fine concave-convex structure made up of a plurality of convex portions 46 having an average interval of 100 nm and a height of 270 nm on the surface was obtained using the same method as in Example 1 except that the aluminum manufactured in Manufacturing example 2 was used, the anodizing was performed for 50 seconds in the process (c), and the pore diameter-enlarging treatment was performed for 8 minutes in the process (d).

For the obtained article, the appearances and haze were evaluated. The results are described in Table 5.

Example 5

An article 40 having a fine concave-convex structure made up of a plurality of convex portions 46 with an average interval: 100 nm and a height: 150 nm on the surface was obtained using the same method as in Example 1 except that the aluminum manufactured in Manufacturing example 3 was used.

For the obtained article, the appearances and haze were evaluated. The results are described in Table 5.

Comparative Example 1

An article 40 having a fine concave-convex structure made up of a plurality of convex portions 46 having an average interval of 100 nm and a height of 150 nm on the surface was obtained using the same method as in Example 1 except that the aluminum manufactured in Comparative manufacturing example 1 was used.

For the obtained article, the appearances and haze were evaluated. The results are described in Table 5.

Comparative Example 2

An article 40 having a fine concave-convex structure made up of a plurality of convex portions 46 having an average interval of 100 nm and a height of 150 nm on the surface was obtained using the same method as in Example 1 except that the aluminum manufactured in Comparative manufacturing example 2 was used.

For the obtained article, the appearances and haze were evaluated. The results are described in Table 5.

Comparative Example 3

An article 40 having a fine concave-convex structure made up of a plurality of convex portions 46 having an average interval of 100 nm and a height of 150 nm on the surface was obtained using the same method as in Example 1 except that the aluminum manufactured in Comparative manufacturing example 3 was used.

For the obtained article, the appearances and haze were evaluated. The results are described in Table 5.

Comparative Example 4

An article 40 having a fine concave-convex structure made up of a plurality of convex portions 46 having an average interval of 100 nm and a height of 150 nm on the surface was obtained using the same method as in Example 1 except that the aluminum manufactured in Comparative manufacturing example 4 was used.

For the obtained article, the appearances and haze were evaluated. The results are described in Table 5.

TABLE 5

| | Aluminum base material | Annealing temperature (° C.) | Average crystal grain diameter (μm) | Fine pore Average interval (nm) | Fine pore Depth (nm) | Convex portion Height (nm) | Evaluation Appearance | Evaluation Haze |
|---|---|---|---|---|---|---|---|---|
| Example 1 | Manufacturing example 1 | 340 | 49 | 100 | 160 | 150 | B | B |
| Example 2 | Manufacturing example 1 | 340 | 49 | 100 | 210 | 200 | A | B |
| Example 3 | Manufacturing example 2 | 340 | 52 | 100 | 160 | 150 | B | B |
| Example 4 | Manufacturing example 2 | 340 | 52 | 100 | 280 | 270 | A | B |
| Example 5 | Manufacturing example 3 | 340 | 51 | 100 | 160 | 150 | B | B |
| Comparative example 1 | Comparative manufacturing example 1 | 400 | 41 | 100 | 160 | 150 | B | C |
| Comparative example 2 | Comparative manufacturing example 2 | 340 | 40 | 100 | 160 | 150 | C | B |
| Comparative example 3 | Comparative manufacturing example 3 | 340 | 86 | 100 | 160 | 150 | C | B |
| Comparative example 4 | Comparative manufacturing example 4 | 340 | 35 | 100 | 160 | 150 | C | B |

INDUSTRIAL APPLICABILITY

The stamper manufactured using the manufacturing method of the invention is useful for manufacturing an anti-reflection article, an antifogging article, an antifouling article and a water-repellent article.

REFERENCE SIGNS LIST

10 ALUMINUM BASE MATERIAL
12 FINE PORE (FINE CONCAVE-CONVEX STRUCTURE)
14 OXIDE FILM
18 STAMPER
20 ROLL-SHAPED STAMPER
40 ARTICLE
46 CONVEX PORTION (FINE CONCAVE-CONVEX STRUCTURE)

The invention claimed is:

1. A stamper,
   wherein an oxide film having a fine concave-convex structure made up of a plurality of fine pores having an aspect ratio represented by [a depth of the fine pore/an average interval between the fine pores] of 1 to 4 is formed on a surface of an aluminum prototype, which is made of aluminum having a content of Ti of 100 ppm to 500 ppm, a content of B or C of 1 ppm to 50 ppm and a purity of 99.9% or more, and has an average crystal grain diameter of 1 mm or less.

2. The stamper according to claim 1,
   wherein the content of Fe is 200 ppm or less.

3. The stamper according to claim 1, comprising a metallic structure of which the average crystal grain diameter is 70 μm or less.

* * * * *